United States Patent
Ho et al.

(10) Patent No.: US 10,627,839 B2
(45) Date of Patent: Apr. 21, 2020

(54) MULTIPLE INPUT MULTIPLE OUTPUT REGULATOR CONTROLLER SYSTEM

(71) Applicant: QUALCOMM Incorporated, San Diego, CA (US)

(72) Inventors: Ngai Yeung Ho, San Diego, CA (US); Hua Guan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/250,737

(22) Filed: Aug. 29, 2016

(65) Prior Publication Data

US 2017/0255214 A1 Sep. 7, 2017

Related U.S. Application Data

(60) Provisional application No. 62/302,726, filed on Mar. 2, 2016, provisional application No. 62/337,502, filed on May 17, 2016.

(51) Int. Cl.
  *G05F 1/56* (2006.01)
  *G05F 1/46* (2006.01)
  *H02M 3/158* (2006.01)
  *G05F 1/575* (2006.01)
  *G05F 1/577* (2006.01)

(52) U.S. Cl.
  CPC .......... *G05F 1/56* (2013.01); *G05F 1/46* (2013.01); *H02M 3/158* (2013.01); *G05F 1/575* (2013.01); *G05F 1/577* (2013.01); *H02M 3/1584* (2013.01)

(58) Field of Classification Search
  CPC ... G05F 1/56; G05F 1/46; G05F 1/575; G05F 1/577; H02M 3/158; H02M 2001/008; H02M 2001/009; H02M 3/1584; H02M 3/33561; H02J 1/08
  See application file for complete search history.

(56) References Cited

U.S. PATENT DOCUMENTS

| | | | |
|---|---|---|---|
| 6,031,362 A | 2/2000 | Bradley | |
| 6,667,603 B2 * | 12/2003 | Hiraki | G06F 1/26 323/268 |
| 7,564,394 B1 * | 7/2009 | Li | G01R 19/2509 341/122 |

(Continued)

FOREIGN PATENT DOCUMENTS

| CN | 101800474 A | 8/2010 |
|---|---|---|
| WO | 2009044231 A2 | 4/2009 |

OTHER PUBLICATIONS

Rajagopalan J., et al., "Modeling and Dynamic Analysis of Paralleled DC/DC Converters with Master-Slave Current Sharing Control," Eleventh Annual Applied Power Electronics Conference and Exposition, 1996, vol. 2, pp. 678-684.

(Continued)

*Primary Examiner* — Nguyen Tran
*Assistant Examiner* — Demetries A Gibson
(74) *Attorney, Agent, or Firm* — Seyfarth Shaw LLP

(57) ABSTRACT

Circuit techniques control multiple regulator circuits. Regulator circuits are configured to time share voltage control circuitry. The voltage control circuitry may include multiple sets of switches to selectively couple a voltage control circuit with a selected voltage regulation loop of one of the regulators.

24 Claims, 19 Drawing Sheets

(56) References Cited

U.S. PATENT DOCUMENTS

| | | | |
|---|---|---|---|
| 8,749,213 B2* | 6/2014 | Chen | H02M 3/1584 323/267 |
| 8,816,658 B1 | 8/2014 | De Vita et al. | |
| 9,148,101 B2 | 9/2015 | Nonis et al. | |
| 2002/0196005 A1 | 12/2002 | Hiraki et al. | |
| 2005/0017769 A1* | 1/2005 | Nakashima | H03K 19/01852 327/112 |
| 2008/0231115 A1* | 9/2008 | Cho | H02J 1/08 307/41 |
| 2009/0278515 A1 | 11/2009 | Broussard et al. | |
| 2010/0045254 A1* | 2/2010 | Grant | H02M 3/1582 323/283 |
| 2010/0253301 A1* | 10/2010 | Nakada | H02M 1/08 323/282 |
| 2011/0227634 A1* | 9/2011 | Kawasaki | G05F 1/56 327/540 |
| 2011/0241640 A1* | 10/2011 | Qiu | H02M 3/1584 323/283 |
| 2012/0329509 A1 | 12/2012 | Ravichandran et al. | |
| 2014/0368176 A1 | 12/2014 | Mandal et al. | |
| 2015/0091382 A1* | 4/2015 | Ikenaga | H02M 3/1584 307/52 |
| 2015/0188407 A1* | 7/2015 | Golder | H02J 1/00 307/31 |
| 2017/0023958 A1* | 1/2017 | Dixit | G05F 1/56 |
| 2017/0185094 A1* | 6/2017 | Atkinson | G05F 1/59 |

OTHER PUBLICATIONS

International Search Report and Written Opinion—PCT/US2017/017726—ISA/EPO—dated May 29, 2017.

Yang et al., "Fast Transient Asynchronous Digital LDO with Load Regulation Enhancement by Soft Multi-Step Switching and Adaptive Timing Techniques in 65-nm CMOS", CICC, Sep. 2015, 4 Pages.

* cited by examiner

MULTIPLE INPUT MULTIPLE OUTPUT REGULATOR CONTROLLER SYSTEM

CROSS REFERENCE TO RELATED APPLICATIONS

The present application claims the benefit of U.S. Provisional Patent Application No. 62/302,726, filed on Mar. 2, 2016, titled "Multiple Input Multiple Output Regulator Controller System," and U.S. Provisional Patent Application No. 62/337,502, filed on May 17, 2016, titled "Multiple Input Multiple Output Regulator Controller System," the disclosures of which are expressly incorporated herein by reference in their entireties.

FIELD

The present disclosure relate generally to electronic circuits, and more particularly to an improved regulator circuit configuration having a voltage control circuit that is shared among multiple regulator circuits.

BACKGROUND

Electronic systems may use one or more regulated voltages to power various subsystems. A regulator is a circuit that provides such regulated voltages. Regulators are configured to receive an input voltage and generate a regulated output voltage in response. One common type of regulator is a low dropout (LDO) regulator. An LDO regulator is a direct current (DC) linear voltage regulator that can regulate output voltage when the input (or supply) voltage is very close to the output voltage. Other common types of regulator circuits include switching regulators and other linear regulators.

Regulator circuits may be controlled by voltage control circuits, current controller circuits, or both. One common issue associated with conventional regulators is that the controller circuitry may constitute a large portion of the integrated circuit device area of the regulator. This can be a significant amount of device area when the regulator is rated for small power handling. In addition, conventional regulators are designed on a modular basis for system-level integration. Thus, in systems that utilize multiple regulators, multiple instances of the same regulator control circuitry are duplicated for each regulator, which takes up a significant portion of the available integrated device area.

SUMMARY

The aspects described herein relate to a circuit for controlling voltage regulation in regulator circuits. In an aspect of the present disclosure, a circuit is presented. The circuit includes regulator circuits, each configured to receive a voltage control signal, and in accordance therewith, to output a regulated voltage signal. Each regulator circuit comprises a capacitor coupled with a voltage control node to store a control voltage. The circuit also includes a voltage control circuit having an output coupled with the voltage control nodes of the regulator circuits. The voltage control circuit has an input configured to sense regulated voltage signals output from the regulator circuits and to output the voltage control signal to set the control voltages of the regulator circuits. Additionally, the circuit includes a first set of switches configured to selectively couple the output of the voltage control circuit with a selected one of the voltage control nodes of the regulator circuits. The circuit further includes a second set of switches configured to selectively couple a selected one of the regulated voltage signals output from the regulator circuits with the input of the voltage control circuit.

In an aspect, the circuit further comprises at least one buffer circuit. The buffer circuit(s) has an input coupled with one or more voltage control nodes of the regulator circuits and an output coupled with the voltage control circuit to precharge a node of the voltage control circuit.

In an aspect, the circuit further comprises at least one buffer circuit. The buffer circuit(s) has a buffer circuit input coupled with the voltage control circuit output and a buffer circuit output coupled to a regulator circuit of the regulator circuits to provide routing separation between the voltage control circuit and the regulator circuit.

In an aspect, the least one buffer circuit(s) comprises a current regulation loop coupled between a second terminal of a transistor and a first terminal of the transistor. The current regulation loop includes mirror transistors.

In an aspect, the circuit further comprises a third set of switches. The third set of switches are configured to selectively couple the voltage control nodes of the regulator circuits with the output node of the voltage control circuit through buffer circuits to precharge the output node of the voltage control circuit.

In an aspect, the circuit further comprises a third set of switches configured to selectively couple the voltage control nodes of the regulator circuits with an input terminal of a buffer circuit. An output terminal of the buffer circuit is coupled to the output node of the voltage control circuit.

In an aspect, the buffer circuit(s) having an input coupled to the selected one of the voltage control nodes of the regulator circuits is coupled with the output of the voltage control circuit during a first time interval. The selected one of the voltage control nodes of the regulator circuits is coupled with the output of the voltage control circuit through one of the first set of switches during a second time interval following the first time interval. The selected one of the regulated voltage signals output from the regulator circuits is coupled with the input of the voltage control circuit through one of the second set of switches during a third time interval overlapping the first time internal and the second time interval.

In an aspect, each regulator circuit further comprises a buffer circuit having an input coupled to the voltage control node to receive the control voltage and an output configured in a voltage control loop to set the regulated voltage signal at the output of the regulator.

In an aspect, the circuit further comprises clock intervals. The first set of switches selectively couple the output of the voltage control circuit with the selected one of the voltage control nodes during a first clock interval. The second set of switches selectively couple the selected one of the regulated voltage signals output from the regulator circuits with the input of the voltage control circuit during at least a second clock interval. The second clock interval overlaps the first clock interval.

In an aspect, the voltage control circuit comprises a resistor divider circuit. The resistor divider circuit has an input coupled with the second set of switches to receive the regulated voltage signals from the regulator circuits and an output configured to provide a feedback voltage signal.

In an aspect, the resistor divider circuit comprises a variable resistance element to adjust a resistance value based on the selected one of the regulated voltage signals output from the regulator circuits.

In an aspect, the voltage control circuit further comprises an amplifier. The amplifier includes a first input coupled with the resistor divider circuit to receive the feedback voltage signal and a second input coupled to receive a reference voltage signal. The amplifier also includes an output to generate the voltage control signal based on comparing the feedback voltage signal with the reference voltage signal.

In an aspect, a first regulated voltage signal output from a first one of the regulator circuits is different than a second regulated voltage signal output from a second one of the regulator circuits.

In an aspect, the voltage control circuit and the first and second set of switches form a voltage regulation loop for each of the regulators. The voltage regulation loop is configured to regulate the control voltage of the voltage control nodes of the regulator circuits. In an aspect, the voltage regulation loop forms a discrete-time voltage regulation loop for each of the regulator circuits at different time intervals.

In an aspect, one or more regulator circuits further comprise a current control circuit. The current control circuits may form continuous-time current regulation loops for each regulator. The current control circuits may also have a faster response time than a response time of the voltage control circuit.

In an aspect, the current control circuit includes a pass transistor. The pass transistor has a first terminal to receive an input voltage for a selected regulator circuit, a second terminal to provide a regulated output voltage to an output node of the selected regulator circuit, and a control terminal. The current control circuit also includes a current sensing transistor. The current sensing transistor has a first terminal coupled with the second terminal of the pass transistor at the output of the regulator circuit. The current sensing transistor also has a second terminal to output a loop current complementary to a load current at the output node of the selected regulator circuit, and a control terminal to receive the voltage control signal from the voltage control circuit. The current control circuit further includes a current regulation loop coupled between the second terminal of the current sensing transistor and the control terminal of the pass transistor. The current regulation loop comprising current mirrors and one or more current summation circuits.

In an aspect, the regulator circuits are linear regulator circuits. In another aspect, the regulator circuits are switching regulator circuits. In an aspect, at least one switching regulator circuit comprises a comparator having an input coupled to the voltage control node, at least one switching transistor, and an inductor coupled to a terminal of the switching transistor(s). In an aspect, the switching regulator(s) further comprises a current control circuit having an input configured to sense a current and an output coupled to a second terminal of the comparator.

In another aspect of the present disclosure, a method is presented. The method includes generating regulated voltage signals output from each of a set of regulator circuits. Each regulator circuit comprises a capacitor coupled with a voltage control node to store a control voltage. The method also includes selectively coupling a selected one of the regulated voltage signals output from the regulator circuits with an input of a voltage control circuit. Further, the method includes outputting a voltage control signal from an output of the voltage control circuit, and selectively coupling the output of the voltage control circuit with a selected one of the voltage control nodes of the regulator circuits. Each regulator circuit is configured to receive the voltage control signal to set the control voltage, and in accordance therewith, to output a corresponding regulated voltage signal.

In yet another aspect of the present disclosure, a circuit is presented. The circuit includes regulator means for producing regulated voltages. Each regulator means is configured to receive a voltage control signal, and in accordance therewith, to output a regulated voltage signal. Each regulator means comprises means for storing a control voltage on a voltage control node. The circuit also includes voltage control means for controlling the regulator means having an output selectively coupled with the voltage control nodes of the regulator means. The voltage control means has an input configured to sense regulated voltage signals output from the regulator means and to output the voltage control signal to set the control voltages of the regulator means. Additionally, the circuit includes means for selectively coupling the output of the voltage control means with a selected one of the voltage control nodes of the regulator means. The circuit further includes means for selectively coupling a selected one of the regulated voltage signals output from the regulator means with the input of the voltage control means.

The following detailed description and accompanying drawings provide a better understanding of the nature and advantages of the present invention.

BRIEF DESCRIPTION OF THE DRAWINGS

For a better understanding of at least certain aspects, reference will be made to the following detailed description, which is to be read in conjunction with the accompanying drawings.

DETAILED DESCRIPTION

Figure 1:
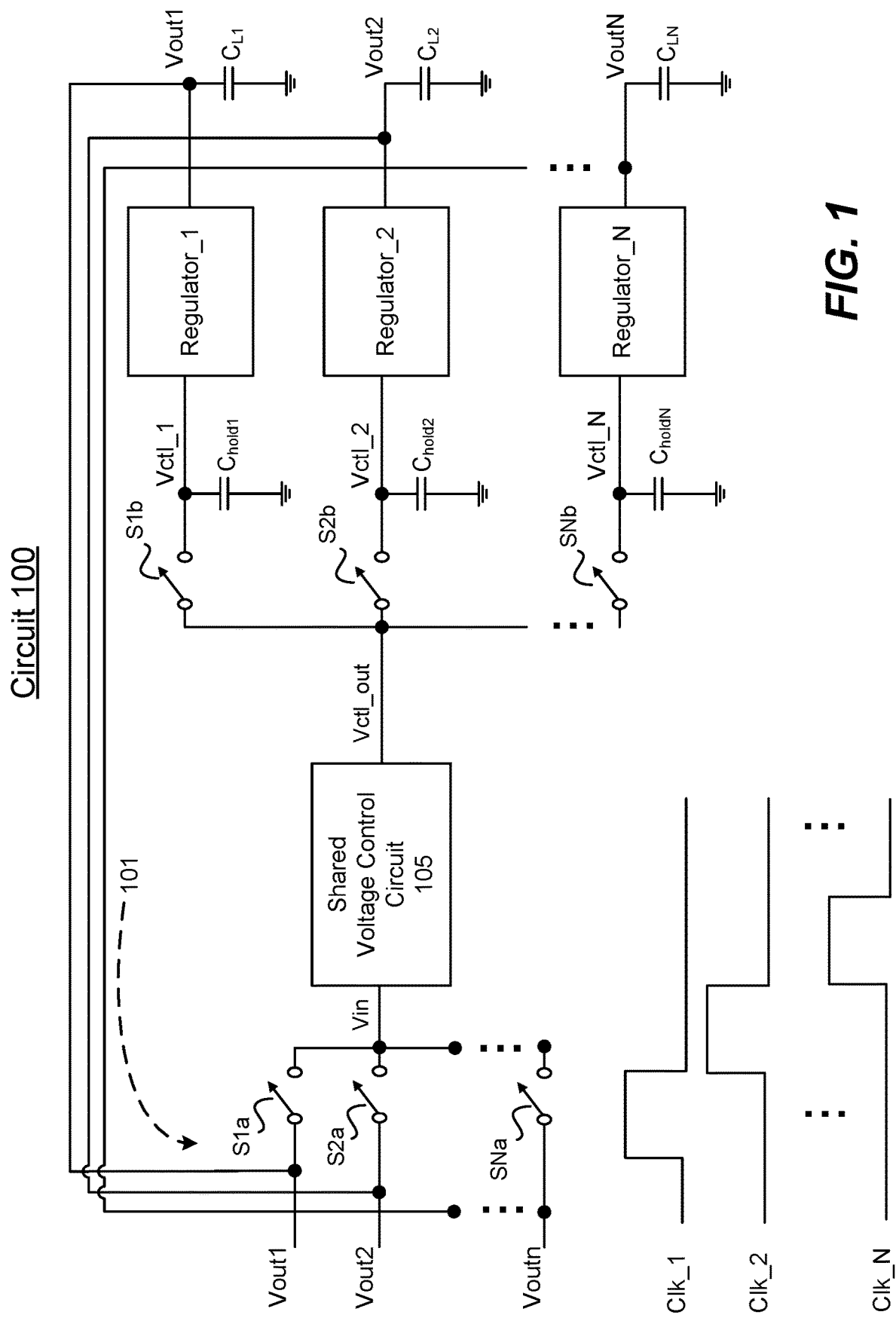
FIG. 1 depicts a block diagram of an exemplary circuit comprising a voltage control circuit time shared among regulator circuits in accordance with aspects of the present disclosure.

Throughout the description, for the purposes of explanation, numerous specific details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the underlying principles of the present disclosure.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

The term "coupled" used throughout this description means "connected, whether directly or indirectly through intervening connections, electrical, mechanical, or otherwise," and is not necessarily limited to physical connections. Additionally, the connection can be such that the objects are permanently connected or releasably connected.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In addition, the aspects described herein are implemented using field effect transistor (FET) technology. It should be noted, however, that the circuit techniques described herein are not limited to any particular type of transistors. It will be appreciated by persons of skill in the art that other types of transistors or equivalent devices may be used to implement the circuit techniques described herein. Further, it should further be noted that although the techniques described herein are based on a PFET transistor configuration, persons of skill in the art will appreciate that many of the disclosed circuits can also be based on an NFET transistor configuration.

Controller logic for conventional voltage regulators encompasses a large portion of the overall integrated circuit device area for the regulator circuitry. Certain aspects of the present disclosure include an improved regulator controller circuit configuration having a voltage control circuit that is time shared among regulators for controlling voltages of the regulator circuits at different time intervals. Sharing the voltage control circuitry is advantageous for, among other things, reducing the overall integrated circuit (IC) device area.

In at least certain aspects, a hybrid control mechanism is disclosed that includes a current control circuit comprising a continuous-time current regulation loop and a shared voltage control circuit comprising a discrete-time voltage regulation loop. The voltage control circuit may be separated from, and shared among, the different regulator circuits, each potentially having a different regulated output voltage. The shared voltage controller circuitry may be separated from the power stage of the regulators and time shared among them. Specifically, the regulator controller hardware of the regulator circuits may be separated into a continuous-time analog current regulation loop to handle the fast transient response for transient load currents and a discrete-time voltage regulation loop that is time shared among the multiple regulators.

Such a time shared voltage control circuit configuration may provide significant cost savings in terms of integrated circuit device area and may also provide more flexibility to circuit designers for system-level placement of the regulator controller circuitry. This may also result in a more simplified design because the number of controllers is limited. In addition, the discrete-time voltage regulation loop may be shared among the controllers to reduce wasted integrated device area.

Provided below are descriptions of example circuits upon which the described aspects may be implemented. Although certain elements may be depicted as separate components, in some instances one or more of the components may be combined into a single component or device. Likewise, although certain functionality may be described as being performed by a single element or component within the circuit, the functionality may in some instances be performed by multiple elements or components working together in a functionally coordinated manner.

FIG. 1 depicts a block diagram of an exemplary circuit 100 comprising a voltage control circuit time shared among regulator circuits. In the illustrated example, circuit 100 comprises a shared voltage control circuit 105 having an output node coupled with regulator circuits regulator_1, regulator_2, . . . , regulator_N. Circuit nodes may be coupled when nodes are directly connected or electrically responsive along a signal path via a voltage or current, for example.

Features and advantages of the present disclosure include a system having multiple regulator circuits, where some or all of the regulator circuits may share a voltage control circuit. In this example, the input of the regulators 1 to N are each coupled with the respective control voltages on voltage control nodes Vctl_1, Vctl_2, . . . , Vctl_N, and the output of the regulator circuits each include an output load capacitance CL1 CL2, . . . , CLN, respectively. The output load capacitances may be the capacitance of the output load of the regulator circuit, for example. The output loads may have other impedances and are not restricted to capacitive loads. Each regulator circuit 1 to N includes the voltage control node, Vctl_1, Vctl_2, . . . , Vctl_N, and an internal capacitance, Chold1, Chold2, . . . , CholdN, respectively. The control voltages of the voltage control nodes, Vctl_1, Vctl_2, . . . , Vctl_N, are stored in the internal capacitors Chold1 Chold2, . . . , CholdN, respectively, for each of the regulators.

The example circuit 100 further includes an input clock signal divided into clock intervals, clk_1, clk_2, . . . , clk_N, having different phases, for example, as shown in FIG. 1. In an aspect of the present disclosure, the clock intervals may be divided into equal time intervals. In other aspects, the duration of the clock intervals may be adjusted individually according to the various parameters and constraints of a particular circuit design. Further, the input clock signal intervals may be generated using one or more clock generator circuits (see, e.g., FIG. 2 below). The input clock signal may be generated by one or more internal or external clock generator circuits. In an aspect, the clock generator circuit(s) may include clock divider circuitry configured for dividing the input clock signal into the clock intervals clk_1, clk_2, . . . , clk_N. In at least certain aspects, the input clock signal intervals may be derived from, or combined with, one or more different clock signals to obtain a resulting input clock signal. The input clock signal may be combined with one or more separate clock signals. For example, the input clock signal may be derived from a clock signal directly input into circuit 100 or via one or more intervening combinational or sequential logic circuits.

In the illustrated example, a voltage control signal Vctl_out at the output node of the shared voltage control circuit 105 is selectively coupled with the input voltage control nodes, Vctl_1, Vctl_2, . . . , Vctl_N, of the regulators via a first set of switches, S1b, S2b, . . . , SNb, in order to regulate voltages of the regulator circuits 1 to N. The first set of switches, S1b, S2b, . . . , SNb, may be implemented as any type of electrical switch capable of selectively establishing and breaking an electrical circuit connection and the aspects described herein are not limited to any particular type of switch or electrical switching technology. The first set of switches, S1b, S2b, . . . , SNb, may be implemented using FET devices. In one aspect, the first set of switches, S1b, S2b, . . . , SNb, may be implemented as a demultiplexer circuit.

The first set of switches, S1b, S2b, . . . , SNb, may be configured to selectively couple the voltage control signal Vctl_out output from the shared voltage control circuit 105 with a selected one of the inputs of the regulators 1 to N at different clock intervals clk_1, clk_2, . . . , clk_N. To accomplish this, the first set of switches, S1b, S2b, . . . , SNb, may each be selected by one of the clock intervals, clk_1, clk_2, . . . , clk_N. The clock intervals may be provided to select the appropriate regulator circuit during the appropriate clock interval, and may be non-overlapping clock phases, for example. In this example, clock interval clk_1 may be coupled to select switch S1b of regulator_1, the clock interval clk_2 may be coupled to select switch S2b of regulator_2, and the clock interval clk_N may be coupled to select switch SNb of regulator_N.

Circuit 100 further includes a second set of switches, S1a, S2a, . . . , SNa, in the voltage regulation loop 101 coupled between regulated voltages, Vout1, Vout2, . . . , VoutN, output from the regulators and an input Vin of the shared voltage control circuit 105. The second set of switches, S1a, S2a, . . . , SNa, may selectively couple a selected one of the regulated voltages, Vout1, Vout2, . . . , VoutN, output from the respective regulators 1 to N with the input Vin of the shared voltage control circuit 105 during one of the respective different clock intervals clk_1, clk_2, . . . , clk_N.

The second set of switches, S1a, S2a, . . . , SNa, may be implemented as any type of electrical switch capable of selectively establishing and breaking an electrical circuit connection and the aspects described herein are not limited to any particular type of switch or electrical switching technology. In one aspect, the second set of switches, S1a, S2a, . . . , SNa, may be implemented as a multiplexer circuit. The second set of switches, S1a, S2a, . . . , SNa, may be implemented using FET devices.

Voltage regulation of the output voltages, Vout1, Vout2, . . . , VoutN, for each of the regulator circuits 1 to N may be performed based on the voltage control signal Vctl_out output from the shared voltage control circuit 105 instead of using individual voltage control circuits for each one of the regulators. This is advantageous because, among other things, the circuit elements of the voltage control circuit 105 need not be duplicated for each one of the regulator circuits. In cases where there are numerous regulators in a circuit implementation, this technique may result in significant integrated circuit device area savings.

In operation, inputs for each of the regulators 1 to N may be selectively coupled with the voltage control signal Vctl_out output from the shared voltage control circuit 105 at different discrete clock intervals, clk_1, clk_2, . . . , clk_N, on a time shared basis. For instance, during a first clock interval (e.g., when clk_1 is active), switches S1a and S1b may be closed to form a connection, while switches s2a, s2b, SNa and SNb, may be open. In this case, the voltage control signal Vctl_out of the voltage control circuit 105 may be selectively coupled with the voltage control node Vctl_1 of regulator_1 via a switch S1b, while the voltage control signal Vctl_out is disconnected from the other voltage control nodes Vctl_2 . . . , Vctl_N. In addition, the regulated output voltage Vout1 of regulator_1 may be selectively coupled with the input Vin of the shared voltage control circuit 105 via switch S1a, while the regulated output voltages Vout2 of regulator_2 and VoutN of regulator_N are disconnected from the shared voltage control circuit 105.

Similarly, during a second clock interval (e.g., when clk_2 is active), switches S2a and S2b may be closed to form a connection, while switches S1a, S1b, SNa and SNb, may be open. In this case, the voltage control signal Vctl_out of the voltage control circuit 105 may be selectively coupled with the voltage control node Vctl_2 of regulator_2 via switch S2b, while the voltage control signal Vctl_out is disconnected from the other voltage control nodes Vctl_2 . . . , Vctl_N. In addition, the regulated output voltage Vout2 of regulator_2 may be selectively coupled with the input Vin of the shared voltage control circuit 105 via switch S2a, while the regulated output voltages Vout1 of regulator_1 . . . , VoutN of regulator_N are disconnected from the shared voltage control circuit 105.

By time sharing the voltage control signal Vctl_out of the voltage control circuit 105 in this manner, circuit 100 is operable to provide the appropriate control voltages to regulate the regulated output voltages Vout1, Vout2, ..., VoutN, of the different regulators 1 to N, respectively, using the same time shared voltage control circuit circuitry. In some aspects, regulators using the described techniques may have the same output voltages (e.g., Vout1=Vout2), and in other aspects different regulators may have different output voltages (e.g., Vout1≠Vout2). Combinations of the same and different output voltages on different regulators using the same voltage control circuit are also possible.

Figure 2A:
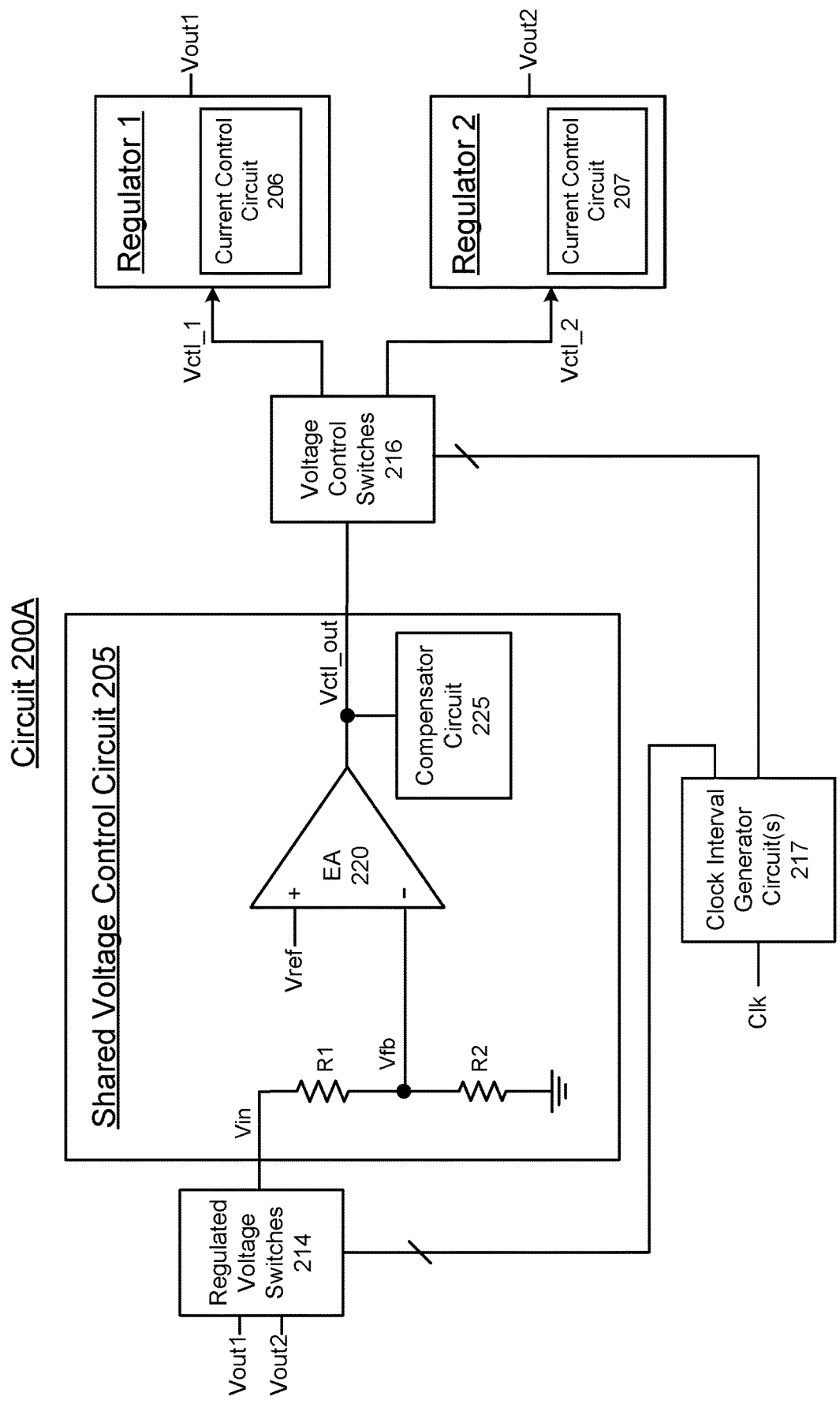
FIG. 2A depicts a block diagram of an exemplary voltage control circuit configured in accordance with aspects of the present disclosure.

FIG. 2A depicts a block diagram of an exemplary voltage control circuit 200A configured in accordance with aspects of the present disclosure. In the illustrated example of FIG. 2A, circuit 200A includes a shared voltage control circuit 205 coupled with inputs of regulators 1 and 2 (e.g., Vctl_1 and Vctl_2), respectively, via a set of voltage control switches 216. The voltage control switches 216 may correspond to the first set of switches, S1b, S2b, ..., SNb, described above with respect to FIG. 1. In one aspect, the voltage control switches 216 may be implemented as a demultiplexer circuit. Similarly, shared voltage control circuit 205 is coupled with outputs of regulators 1 and 2 (e.g., Vout1 and Vout2), respectively, via a set of regulated voltage switches 214. The regulated voltage switches 214 may correspond to the second set of switches, S1a, S2a, ..., SNa, described above with respect to FIG. 1. In one aspect, the voltage control switches 216 may be implemented as a multiplexer circuit.

As shown in FIG. 2A, the shared voltage control circuit 205 includes a resistor divider circuit comprising resistors R1 and R2. The resistor divider circuit may be configured to receive a regulated voltage output from a selected one of the regulators 1 or 2 and to output a feedback voltage signal Vfb in response. The shared voltage control circuit 205 may further comprise an error amplifier 220. The error amplifier 220 may be implemented using an operational amplifier configuration as is well known to persons skilled in the art.

The error amplifier 220 may be configured to detect an error (DC offset) in the output voltages of the regulator circuits resulting from output load currents, for example. The error amplifier 220 may be configured to receive the feedback voltage signal Vfb at a first input and a reference voltage signal Vref at a second input. In one aspect, the error amplifier 220 may be configured to compare the feedback voltage signal Vfb with the reference voltage signal Vref and to provide an output voltage control signal Vctl_out in response to the comparison. For example, errors in the regulated voltages may be detected by the error amplifier 220 by comparing the feedback voltage Vfb at the first input terminal with the reference voltage Vref at the second input terminal. The error amplifier 220 may be configured to drive its output node Vctl_out to correct an output voltage error in response to detecting errors when comparing voltages Vfb with Vref. The error amplifier 220 is configured to drive output Vctl_out in response to differences between the voltages of Vfb and Vref at the inputs of the error amplifier 220.

In the illustrated example of FIG. 2A, the shared voltage control circuit 205 further comprises a compensator circuit 225 coupled with the output node of the shared voltage control circuit 205. In one aspect, the compensator circuit 225 may comprise a single compensation capacitor (not shown) that may be utilized to stabilize fluctuations at the output node of the error amplifier 220 across different processes, voltage, temperature variations, output loading, external capacitance, and/or printed circuit board (PCB) parasitic variations. The compensation capacitor can be utilized to stabilize the voltage regulation loop and to control overshoot and ringing in the step response of error amplifier 220.

Circuit 200A further includes a one or more clock interval generator circuits 217 configured to generate clock signal intervals from a clock, Clk, for example. In one aspect, one or more input clock signal(s) may be divided into clock intervals to be provided to the voltage control switches 216 in order to select each of the regulators during one of the clock intervals (e.g., channel selection). For example, as illustrated in FIG. 1 above, clock intervals Clk_1, ..., Clk_N may be separate clock signals where only one of the clock signals is in a high state at a time to activate particular switches. It is to be understood that a wide range of clock interval techniques could be used to selectively couple different regulators to the shared voltage control circuit. The clock interval generator circuit(s) 217 may include one or more clock divider circuits to generate the clock intervals from the input clock signal Clk, for example. The input clock signal Clk of circuit 200A may be a directly connected clock signal, may be a signal derived from one or more different clock signals, or may be received via one or more intervening combinational or sequential logic circuits.

The example in FIG. 2A illustrates another aspect of the present disclosure. In some aspects, the regulator circuits may include current control circuits. In this example, regulator 1 comprises current control circuit 206, while regulator 2 comprises current control circuit 207. Features and advantages of particular aspects may include regulators that share voltage control circuitry to maintain a voltage control loop, and when particular regulators are disconnected from the voltage control circuitry, current control circuits in some or all of the regulators may maintain current control loops to respond to changes at the output of each regulator, for example. The current control circuits may have faster response times (e.g., wider bandwidth) than the slower response times (e.g., lower bandwidth) of the shared voltage control circuit. In some implementations, the current control circuits in different regulators may have the same architecture, while in other implementations, the current control circuits in different regulators have different architectures. One example implementation of regulators having shared voltage control circuitry and the same current control circuits in each regulator is provided below for illustrative purposes.

Figure 2B:
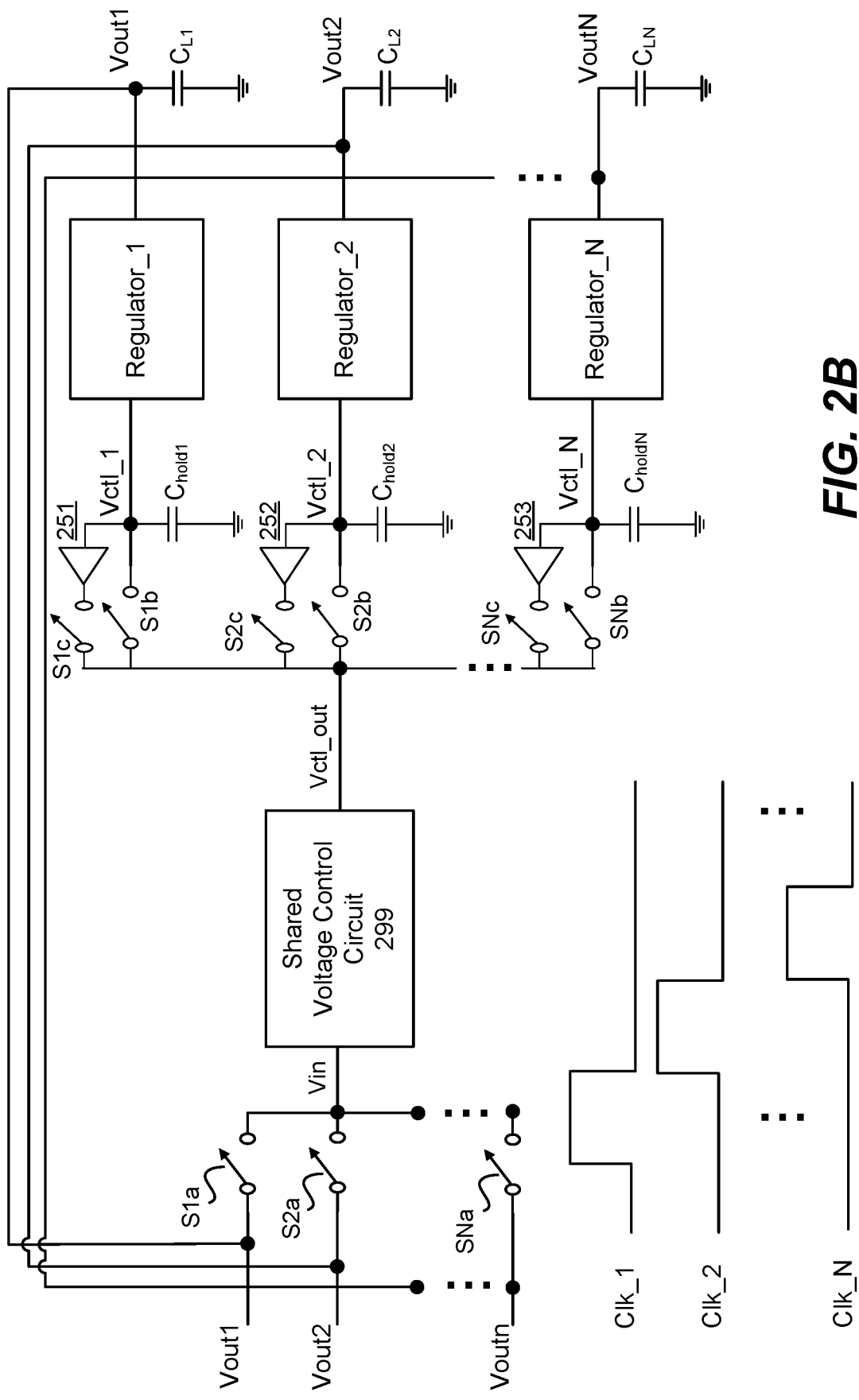
FIG. 2B depicts a block diagram of an exemplary circuit including precharge circuits in accordance with aspects of the present disclosure.

FIG. 2B depicts a block diagram of an exemplary circuit 200B including precharge circuits in accordance with aspects of the present disclosure. The present example illustrates another feature. Here, regulators 1-N generate regulated output voltages using a shared voltage control circuit 299. Aspects of the present disclosure may include precharge circuits for precharging at least one node of the shared voltage control circuit 299 before the shared voltage control circuit 299 is coupled with a regulator control voltage, for example. In this example, precharge circuits precharge the value of Vctl_out before Vctl_out is coupled to different voltage control nodes of different regulators.

In this example, circuit 200B further includes buffer circuits 251, 252, and 253 each having an input terminal coupled the voltage control node Vctl_1, Vctl_2, ..., Vctl_N of the regulators and an output terminal that can be selectively coupled with the voltage control signal Vctl_out output from the shared voltage control circuit 299 via a third set of switches S1c, S2c, ..., SNc. In one aspect, buffers may be implemented using unity gain amplifiers or other circuitry that senses a control voltage and drives Vctl_out to the same voltage, for example.

The third set of switches S1c and S2c may be configured to selectively couple the internal control voltages (stored in the internal capacitors Chold1 Chold2, . . . , CholdN) of the voltage control nodes, Vctl_1, Vctl_2, . . . , Vctl_N of the respective regulator circuits with the voltage control signal Vctl_out of the shared voltage control circuit 299 via the buffer circuits 251-253. This may be done to precharge the output voltage control node of the shared voltage control circuit 299 before the internal voltage control node, Vctl_1 or Vctl_2 or Vctl_N, is selectively coupled with the output node of the shared voltage control circuit 299.

In the illustrated example, switch S1c may be selectively coupled between the output terminal of buffer circuit 251 and the output node of the shared voltage control circuit 299. Similarly, switch S2c may be selectively coupled between the output terminal of buffer circuit 252 and the output node of the shared voltage control circuit 299. Likewise, switch SNc may be selectively coupled between the output terminal of buffer circuit 253 and the output node of the shared voltage control circuit 299.

Switch S1c may be configured to selectively couple the control voltage on internal control node Vctl_1 of regulator_1 with the Vctl_out of the shared voltage control circuit 299 to precharge the voltage control signal Vctl_out to a value approaching the control voltage of Vctl_1 during a clock interval before switch S1b is activated to selectively couple the voltage control signal Vctl_out with the internal voltage control node Vctl_1 of regulator_1, for example. Clock interval Clk_1 may close switch S1c and clock interval Clk_2 may close switch S1b so that the voltage on Vctl_out is approximately equal to the control voltage Vctl_1 before switch S1b is closed.

Likewise, switch S2c may be configured to selectively couple the control voltage on internal control node Vctl_2 of regulator_2 with the Vctl_out of the shared voltage control circuit 299 to precharge the voltage control signal Vctl_out to a value approaching the control voltage of Vctl_2 during a clock interval before switch S2b selectively couples the voltage control signal Vctl_out with the internal voltage control node Vctl_2 of regulator_2.

One reason precharging may be advantageous is because each of the different regulators may have different input voltages and/or output voltages, for example, and may operate with different control voltage levels. Thus, in order to prevent errors in voltage levels in the internal voltage control nodes, Vctl_1, Vctl_2, . . . , Vctl_N, when the internal voltage control nodes are first coupled with the voltage control signal Vctl_out output from the shared voltage control circuit 299, the output nodes of buffer circuits may first be selectively coupled with the output node of the shared voltage control circuit 299 via switches S1c, S2c, . . . , SNc, to precharge the voltage control signal Vctl_out to an appropriate value to regulate particular voltages on different regulators.

The three sets of switches, SXa, SXb, and SXc, may be operated to selectively coupled each regulator in a closed voltage feedback loop to regulate the voltages at each regulators output, where X is a number from 1 to N (e.g., S1a, S1b, and S1c, etc.). For example, a first buffer circuit 251 has an input coupled to voltage control node Vctl_1 for regulator_1 and an output coupled with the output voltage of the voltage control circuit, Vctl_out, during a first time interval when S1c is closed. Vctl_out is then coupled through switch S1b to voltage control node Vctl_1 during a second time interval following the first time interval. During the second time interval, S1c may be opened and S1b is closed, for example. In one aspect, the regulated voltage Vout1 output from regulator_1 is coupled with the input of the voltage control circuit (e.g., Vin) through switch S1a during a third time interval, which may be approximately equal to the sum of the first time internal and the second time interval. Referring to FIG. 2B, clock phase interval Clk_1 may set the first time interval for closing switch S1c and clock phase interval Clk_2 may set the second time interval for closing switch S1b. In this example, switch S1a is closed during the duration of both Clk_1 and Clk_2. Overlapping sequential time intervals for precharging (e.g., closing switches SXc) and then setting the control voltages Vctl_X (e.g., closing switches SXb) for each regulator may be advantageous to ensure the Vctl_out is set to the proper value before closing the voltage loop to reduce voltage transients and speed up the voltage regulation process, for example. It is to be understood that setting the above mentioned time intervals using clock phases is one technique for establishing time intervals. Other techniques for selectively coupling regulators with a shared voltage control circuit could also be used.

Figure 2C:
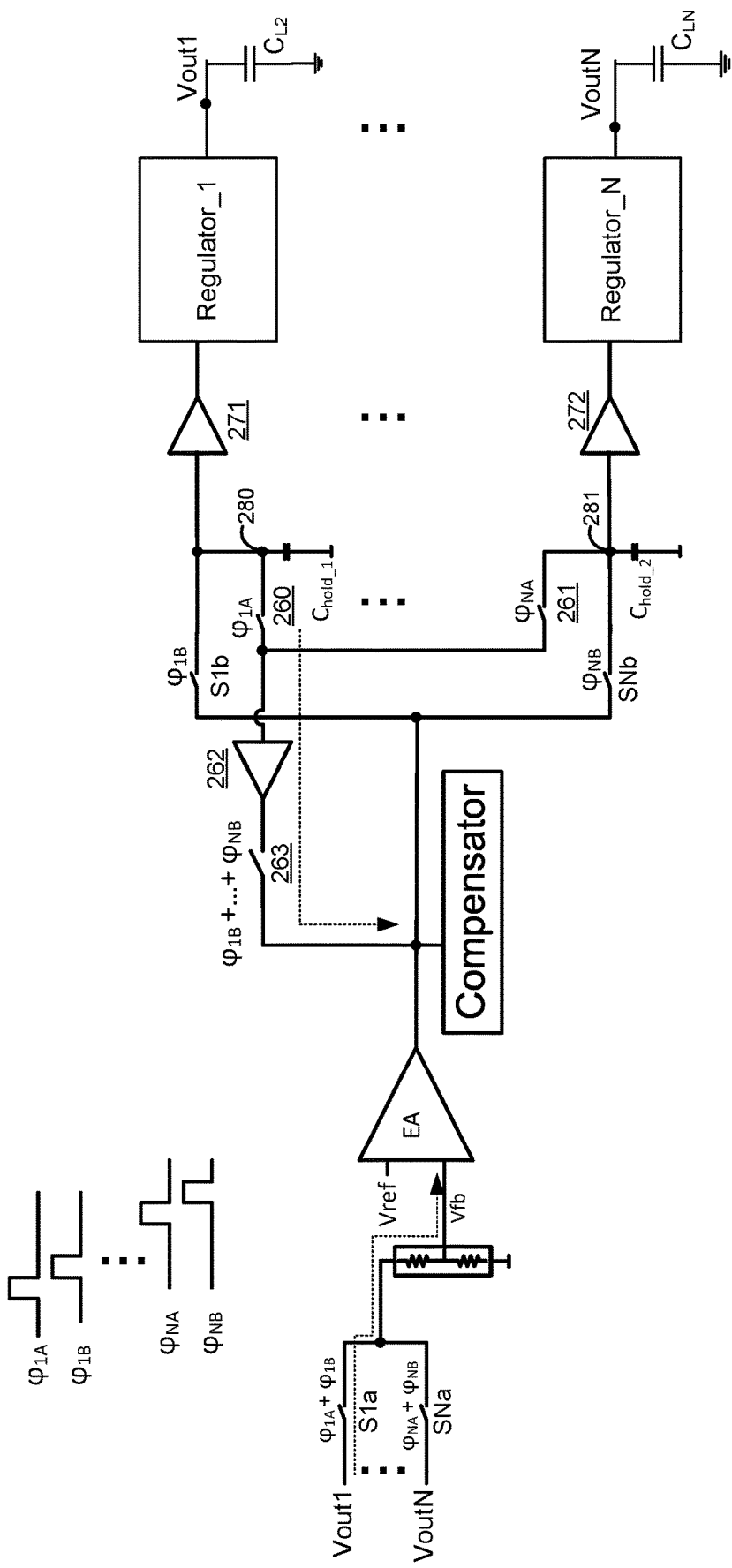
FIG. 2C depicts a block diagram of another exemplary circuit including precharge circuits in accordance with aspects of the present disclosure.

FIG. 2C depicts a block diagram of another example circuit including precharge circuits in accordance with aspects of the present disclosure. In this example, control voltages on multiple capacitors are selectively coupled through one or more shared buffer circuits for the precharge operation. In this example, a third set of N switches 260-261 is configured to selectively couple N voltage control nodes 280-281 of the N regulator circuits with an input terminal of a buffer circuit 262. Switch 260 is the first switch and switch 261 is the Nth switch and voltage control node 280 is the first voltage control node and voltage control node 281 is the Nth voltage control node. An output terminal of the buffer circuit 262 is coupled to the output node of the voltage control circuit, which in this example is the output of an error amplifier (EA) and a terminal of a compensator circuit. Switches 260-261 selectively couple voltage control nodes 280-281 to the input of buffer circuit 262 to precharge the output of the shared voltage control circuit. For example, during a first time interval φ1A, switch 260 may be closed and switch 261 may be open. Accordingly, a voltage on node 280 is coupled to an input of buffer circuit 262. In this example, an output of buffer circuit 262 is coupled to a node in the voltage control circuit through a switch 263, which may be closed only during the precharge phase and open when the voltage control circuit (e.g., the error amplifier) is in a closed voltage regulation loop to prevent buffer circuit 262 from interfering with the voltage control circuitry, for example. As illustrated in FIG. 2C, switch 263 is open during time intervals φ1B . . . φNB, which correspond to the voltage control circuit being in different voltage regulation loops with different regulators, for example. During precharge, switch 263 is open and the output of voltage control circuit is decoupled from the regulators by opening switches.

FIG. 2C further illustrates another example feature. In this example, each regulator circuit further comprises a buffer circuit, such as buffer circuits 271-272, having an input coupled to voltage control node to receive the control voltage and an output configured in a voltage control loop to set the regulated voltage signal at the output of the regulator. In this example, buffer circuit 271 has an input coupled to voltage control node 280 to receive a control voltage on Chold_1 and an output configured in a voltage control loop to set the regulated voltage signal Vout1 at the output of the regulator_1. Similarly, buffer circuit 272 has an input coupled to voltage control node 281 to receive a control voltage on Chold_2 and an output configured in a voltage control loop to set the regulated voltage signal VoutN at the output of the regulator_N. It is to be understood that many such regulators N, where N is an integer, may be configured as shown in FIG. 2C to produce the same or different output voltages, Vout. Further, buffer circuits as shown here may be implemented using unity gain amplifiers, for example, or equivalent circuits for precharging the output of the voltage control circuit or coupling the control voltages into voltage control loops, or both as illustrated above.

Figure 2D:
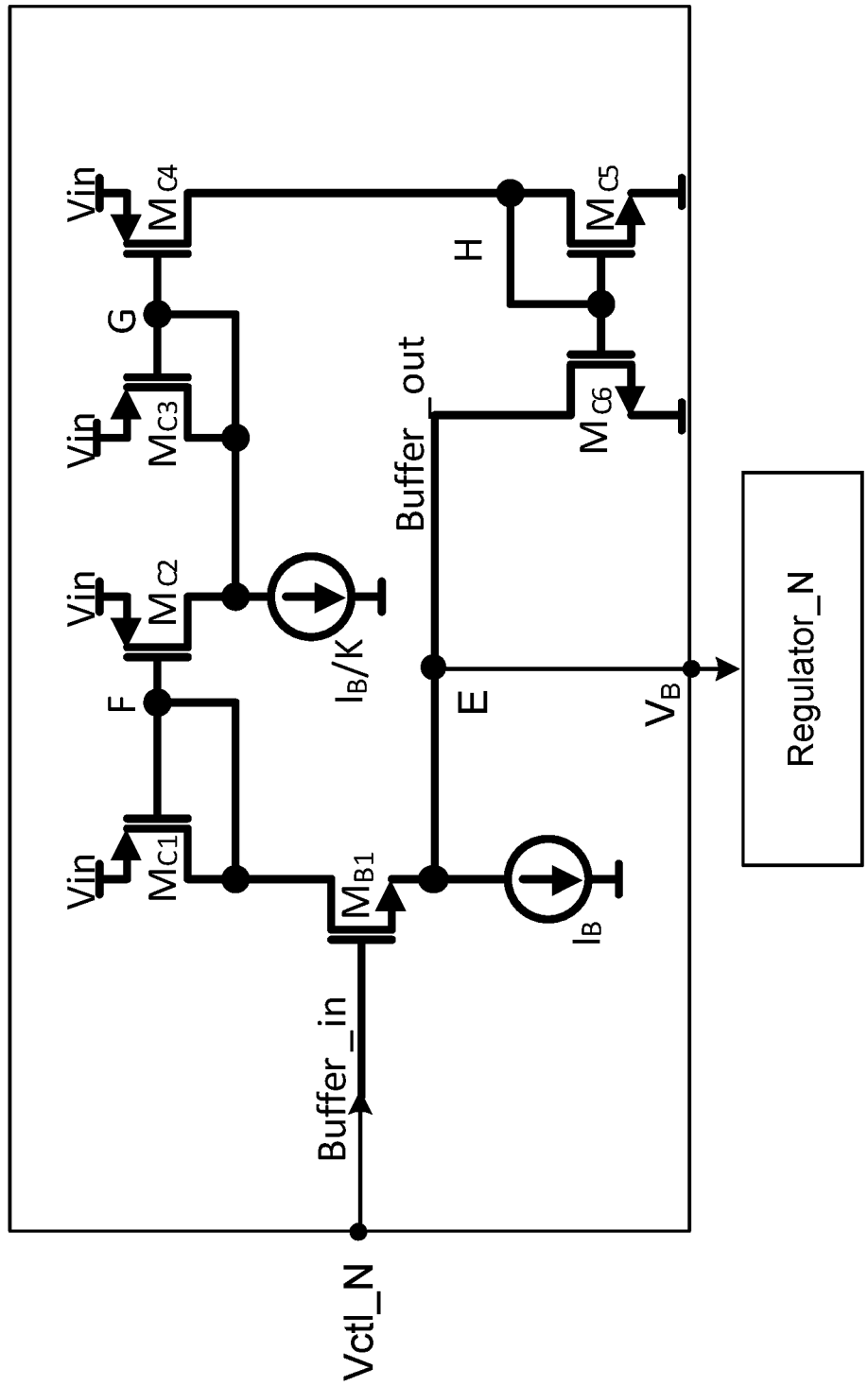
FIG. 2D depicts a block diagram of an exemplary buffer circuit for extended routing between a regulator controller and regulator circuits in accordance with aspects of the present disclosure.

FIG. 2D depicts a block diagram of an exemplary buffer circuit 270 in accordance with aspects of the present disclosure. In the example of FIG. 2D, buffer circuit 270 may include a buffer circuit input (e.g., a control terminal of transistor MB1) for receiving input buffer voltage buffer_in. The buffer circuit input may, for example, be coupled with voltage control circuit (e.g., shared voltage control circuit 299 of FIG. 2B) via voltage control node Vctl_N. For instance, Vctl_N may be one of a set of voltage control nodes (e.g., Vctl_1, Vctl_2, Vctl_N) coupling buffer circuits 251-253 to regulator circuits regulator_1-regulator_N, as shown in FIG. 2B. Additionally, buffer circuit 270 may, for example, be coupled to voltage control output Vctl_out of shared voltage control circuit 299 of FIG. 2B via buffer circuits 251-253.

Buffer circuit 270 may further provide buffer circuit output voltage buffer_out at buffer circuit output (e.g., node E). Node E can be coupled to regulator circuit regulator_N (e.g., regulator_1-regulator_N of FIG. 2C) through control node VB. In related aspects, and by way of example, buffer circuit 270 may be implemented as buffer circuits 271-272 as shown in FIG. 2C. For example, buffer circuits 271-272 each may supply output voltage buffer_out at node E to the regulator circuits regulator_1-regulator_N coupled to node VB_N.

Buffer circuit 270 provides separation between the voltage control circuit (e.g., shared voltage control circuit 299 of FIG. 2B) and the regulator circuits (e.g., regulator_1-regulator_N of FIG. 2B) in order to reduce routing parasitics and channel coupling between the two. Notably, linear regulator separation is challenging because the signals are analog in nature and it is difficult to create a low power and low impedance buffer to drive the analog signal and reject high swing coupling. In accordance with aspects of the present disclosure, buffer circuit 270 may extend the routing distance the controller may be placed apart from the power stage (e.g., regulator circuits) with reduced channel coupling. That is, unlike conventional controller and power stages (e.g., regulator circuits) which reside together (or in close routing proximity), using buffer circuit 270, the controller (e.g., shared voltage control circuit 299 of FIG. 2B) and the power stage (e.g., regulator_1-regulator_N of FIG. 2B) may be spaced apart on a printed circuit board without increased routing parasitics.

Referring to FIG. 2D, voltage control node Vctl_N may be coupled to the buffer circuit input (e.g., the control terminal of transistor MB1). A first terminal of transistor MB1 may be coupled to current source IB, and a second terminal of transistor MB1 may be coupled to input voltage Vin. Buffer circuit 270 may further comprise a current regulation loop coupled between the second terminal of transistor MB1 and the first terminal of transistor MB1. In the illustrated example of FIG. 2D, the current regulation loop includes current mirror circuits comprising current mirror transistors MC1/MC2, MC3/MC4, and MC5/MC6 and current source IB/K (K>1) coupled with voltage Vin.

In operation, buffer circuit 270 has the ability to pull up or pull down voltage using the current sources in order to maintain a steady output voltage buffer_out at node E. For example, when a voltage value at node E goes high, a drain current in transistor MB1 is reduced. If the drain current is smaller than a reference current (e.g., IB/K), it will activate a large pull down current (e.g., equal to a current across transistor MC3 minus a current across transistor MC6) to pull down the voltage value at node E. Additionally, the current across transistor MC6 is opposite a direction of the current across transistor MB1 due to current subtraction between transistors MC2 and MC3.

It is to be understood to one of ordinary skill in the art that the buffer circuit 270 is merely exemplary and can be implemented in a voltage mode implementation, a current mode implementation or other implementation.

Figure 2E:
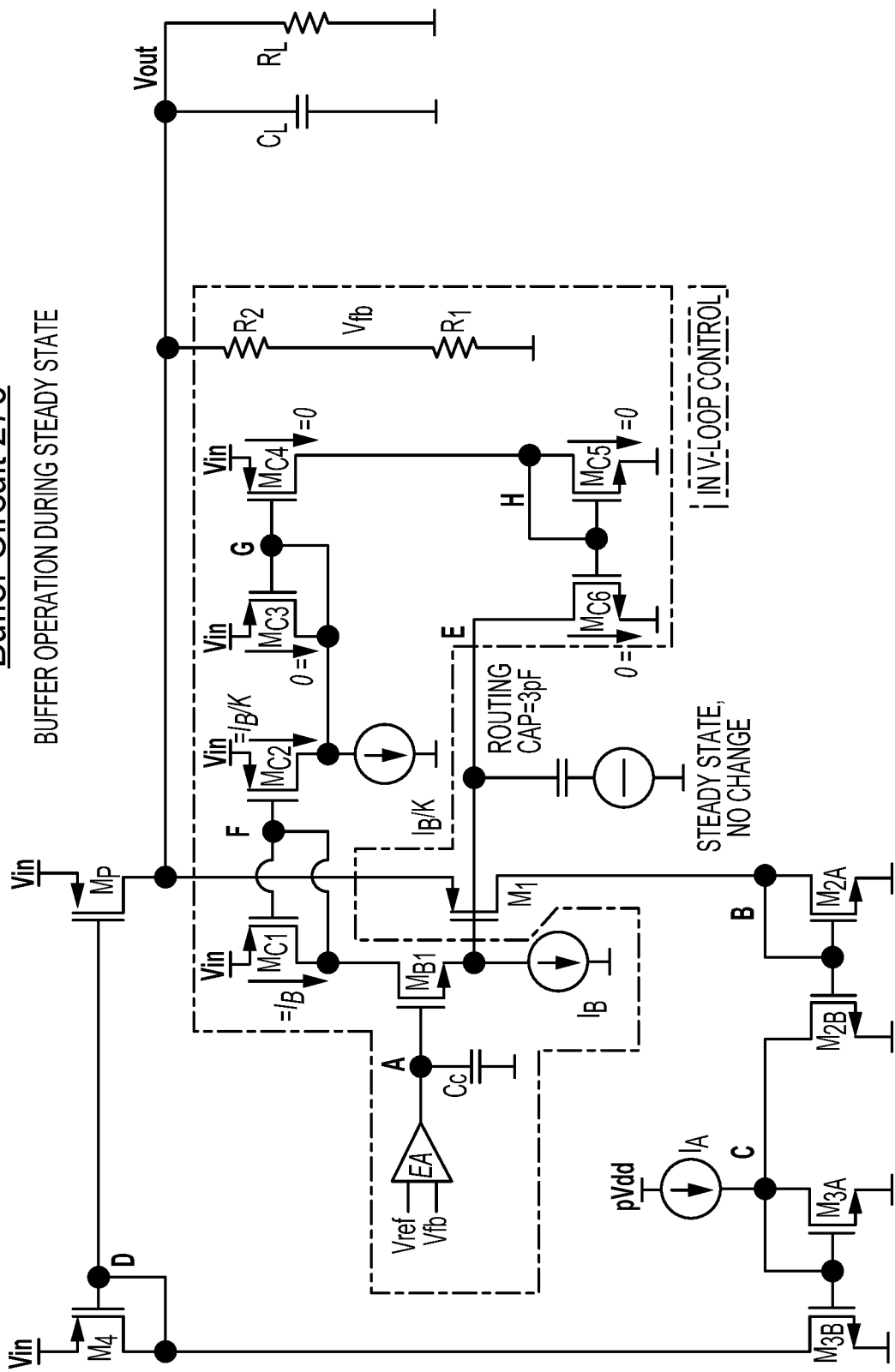
FIG. 2E depicts a block diagram of a buffer circuit for extended routing between a regulator controller and regulator circuits during a steady state operation in accordance with aspects of the present disclosure.

FIG. 2E depicts an example block diagram of buffer circuit 270 during a steady state operation. As depicted in the example of FIG. 2E, during steady state where a current source does not change and a routing capacitor is at a value of 3 pF, the voltage across transistor MC1 is equal to IB, the voltage across transistor MC2 is equal to IB/K, and the voltage across mirror transistors MC3/MC4 and MC5/MC6 is zero. For the purposes of this example, the routing capacitor and steady state current source are model elements, and can be replaced with equivalent circuits. Furthermore, the capacitance value of the routing capacitor (3 pF) is merely exemplary and not limiting.

Figure 2F:
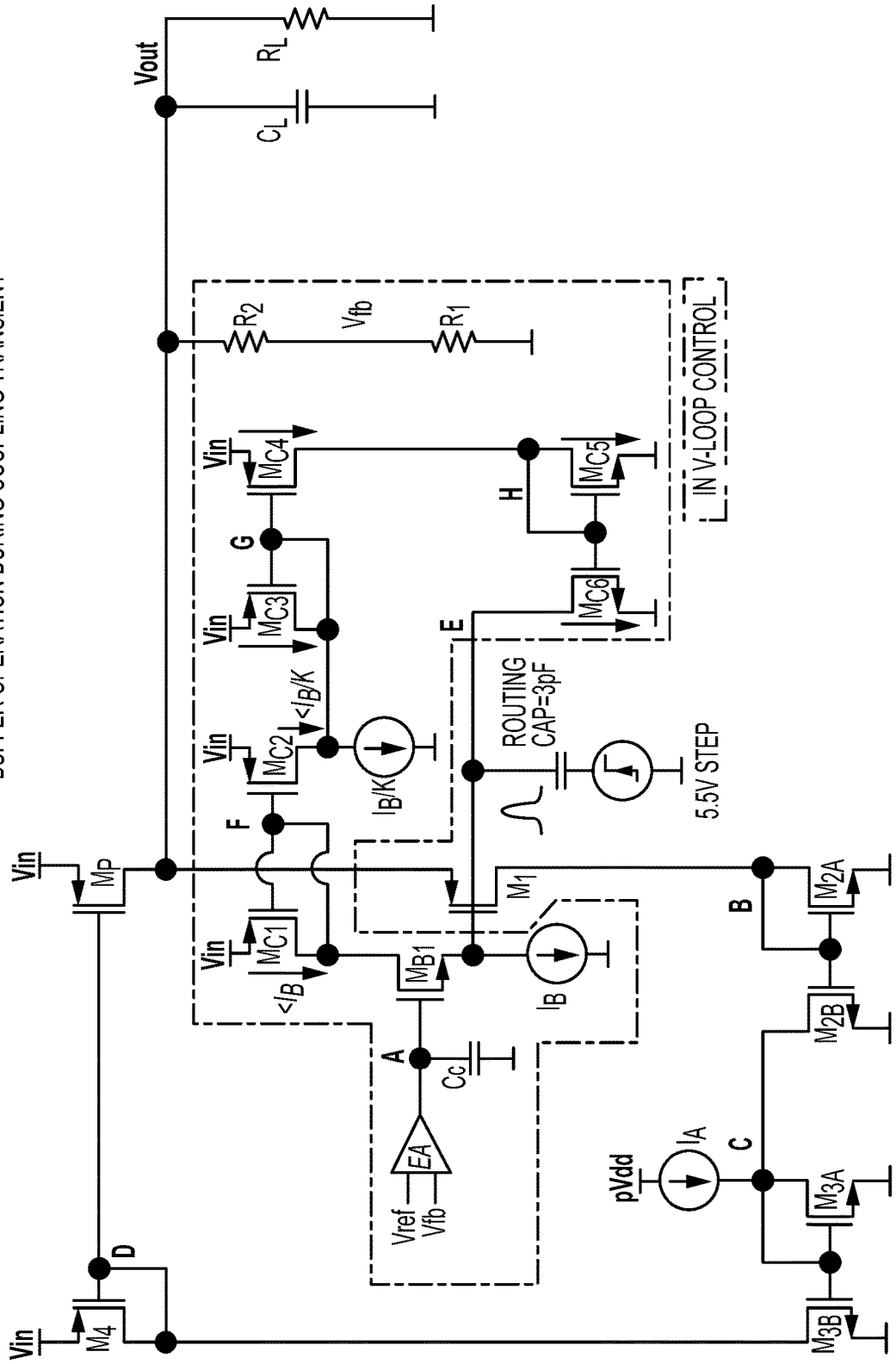
FIG. 2F depicts a block diagram of buffer circuit for extended routing between a regulator controller and regulator circuits during a coupling transient state operation in accordance with aspects of the present disclosure.

FIG. 2F depicts an example block diagram of buffer circuit 270 during a coupling transient state operation. During a coupling transient operation, (e.g., when the voltage at node E goes high due to the 5.5V step up current from the current source), the current across transistor MC1 is less than IB, the voltage across transistor MC2 is less than IB/K, and the voltage across mirror transistors MC3/MC4 and MC5/MC6 is greater than zero. This activates a pull down current to compensate for any spikes in the output voltage buffer_out at node E. For the purposes of this example, the routing capacitor and step up current source are model elements, and can be replaced with equivalent circuits. The capacitance value of the routing capacitor (3 pF) is merely exemplary and not limiting.

Figure 2G:
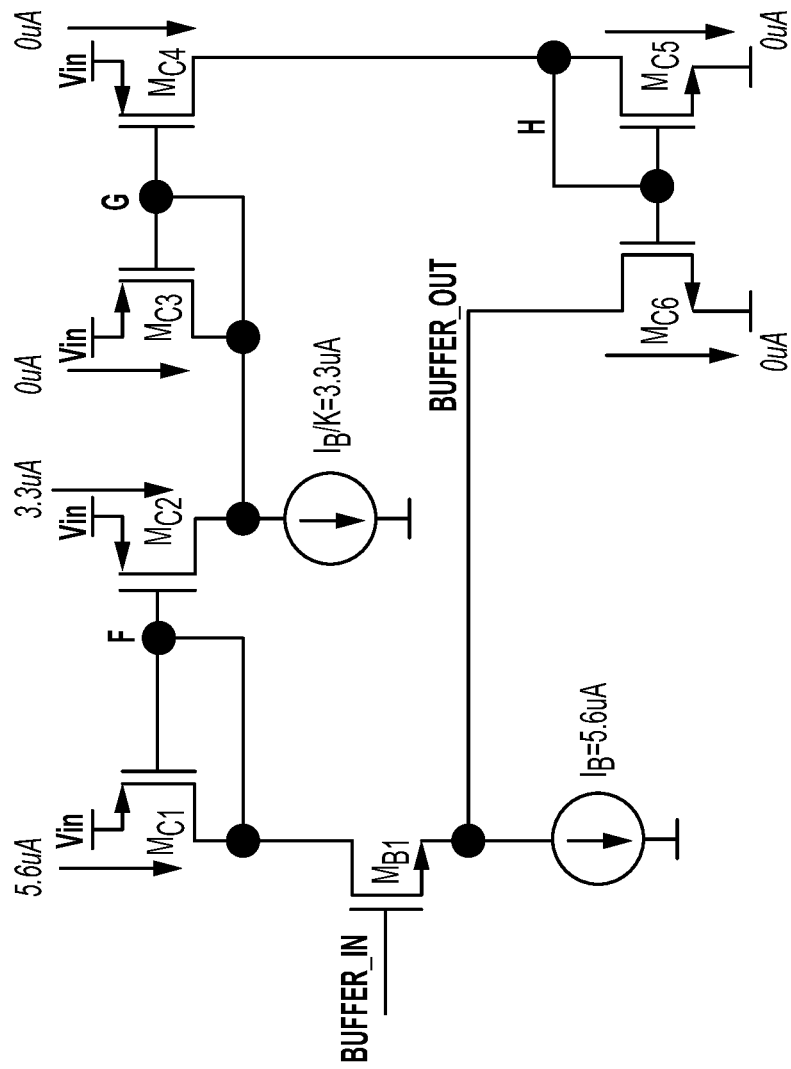
FIG. 2G is a block diagram depicting an example of a buffer circuit operating in a normal power mode (NPM) in accordance with aspects of the present disclosure.

FIG. 2G depicts a block diagram of an exemplary buffer circuit 270 for normal power mode (NPM) bias current. As depicted, when current source IB is 5.6 µA and IB/K is 3.3 µA, the voltage across transistor MC1 is equal to 5.6 µA, the voltage across transistor MC2 is equal to 3.3 µA, and the voltage across mirror transistors MC3/MC4 and MC5/MC6 is 0 µA. The values of current source IB and IB/K are exemplary only and non-limiting, and other values are contemplated.

Figure 2H:
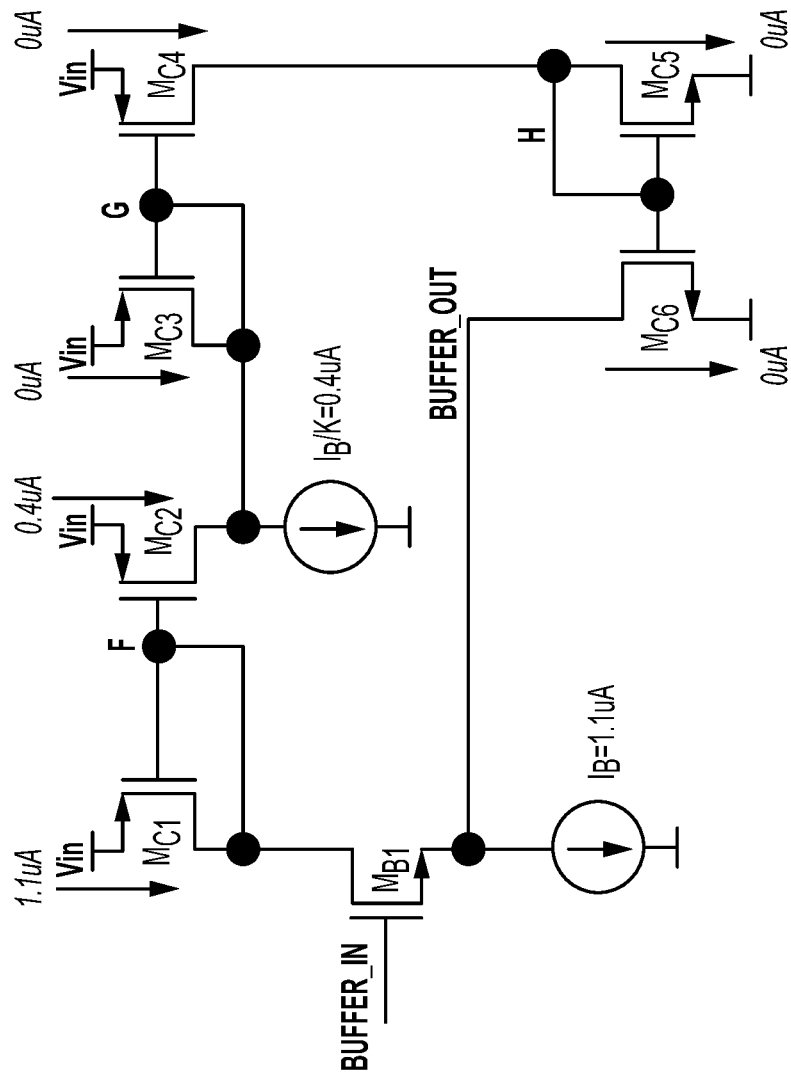
FIG. 2H is a block diagram depicting an example of a buffer circuit operating in a low power mode (LPM) in accordance with aspects of the present disclosure.

FIG. 2H depicts a block diagram of an exemplary buffer circuit 270 for low power mode (LPM) bias current. As depicted, when current source IB is 1.1 µA and IB/K is 0.4 µA, the voltage across transistor MC1 is equal to 1.1 µA, the voltage across transistor MC2 is equal to 0.4 µA, and the voltage across mirror transistors MC3/MC4 and MC5/MC6 is 0 µA. The values of current source IB and IB/K are exemplary only and non-limiting, and other values are contemplated.

Figure 3A:
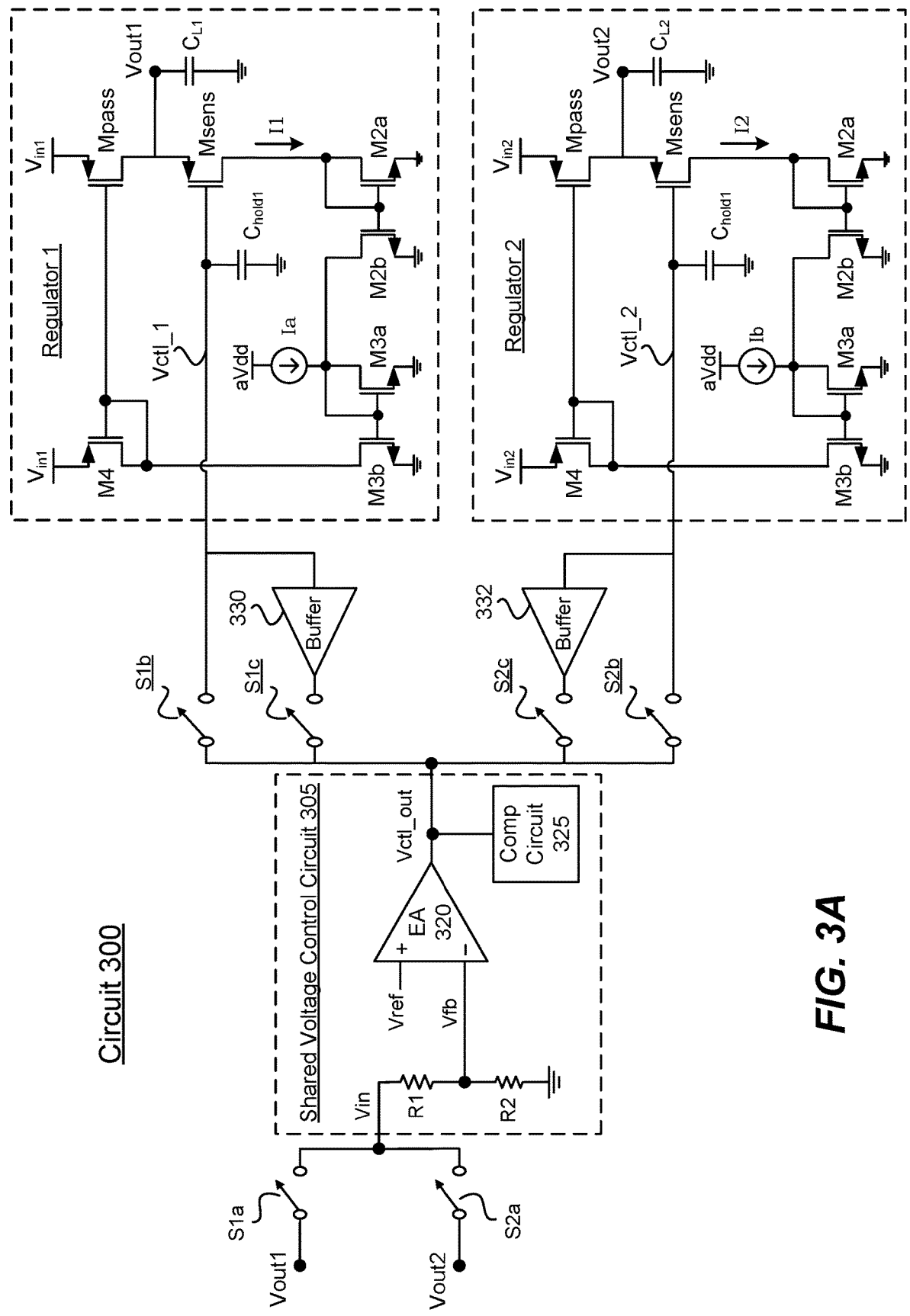
FIGS. 3A-3C depict block diagrams of an exemplary circuit configuration for controlling regulator circuits in accordance with aspects of the present disclosure.

FIG. 3A depicts a block diagram of an exemplary circuit 300 for controlling a regulator circuits in accordance with aspects of the present disclosure. In this illustrated example, circuit 300 includes a shared voltage control circuit 305 coupled with voltage control nodes, Vctl_1 and Vctl_2, at the inputs of regulator circuits 1 and 2. The shared voltage control circuit 305 includes a resistor divider circuit comprising resistors R1 and R2, an error amplifier 320, and a compensator circuit 325, each operable to perform the functions described above with respect to the shared voltage control circuit 205 of FIG. 2A, for example.

Circuit 300 further includes a first set of switches S1b and S2b, a second set of switches S1a and S2a, and a third set of switches S1c and S2c. The first set of switches S1b and S2b may be configured to selectively couple a voltage control signal Vctl_out output from the shared voltage control circuit 305 with a selected one of the voltage control nodes Vctl_1 and Vctl_2 of regulators 1 and 2, respectively, at different clock intervals. For example, the output node of the shared voltage control circuit 305 may be selectively coupled with the input voltage control node Vctl_1 of regulator 1 via the switch S1b during a first clock interval or selectively coupled with the input voltage control node Vctl_2 of regulator 2 via the switch S2b during a second clock interval.

The second set of switches S1a and S2a may be coupled between regulated voltages Vout1 and Vout2 output from the regulators 1 and 2, respectively, and the input voltage Vin of the shared voltage control circuit 305 at different clock intervals derived from an input clock signal (not shown). For example, the input node Vin of the shared voltage control circuit 305 may be selectively coupled with the regulated output voltage Vout1 of regulator 1 via the switch S1a during a first clock interval or selectively coupled with the regulated output voltage Vout2 of regulator 2 via the switch S2b during a second clock interval.

As shown in FIG. 3A, regulator 1 includes input voltage terminals to receive an input voltage Vin1 and an output voltage terminal having an output load capacitance CL1. Regulator 1 further comprises an input power stage comprising pass transistor Mpass. The input voltage Vin1 may be coupled with a first terminal of the input power stage transistor Mpass and the regulated output voltage Vout1 may be coupled with a second terminal of the input power stage transistor Mpass. Likewise, regulator 2 includes input voltage terminals to receive an input voltage Vin2 and an output voltage terminal having an output load capacitance CL2. Regulator 2 further comprises an input power stage comprising pass transistor Mpass. The input voltage Vin2 may be coupled with a first terminal of the input power stage transistor Mpass and the regulated output voltage Vout2 may be coupled with a second terminal of the input power stage transistor Mpass.

In this example, each of the regulators 1 and 2 further includes a current control circuit comprising a current regulation loop. In FIG. 3A, the components of regulator 1 further comprise (1) a current sensing transistor Msens having a first terminal coupled with the second terminal of the pass transistor Mpass at the output of regulator 1, a second terminal to output a loop current I1 complementary to a load current at the output node of regulator 1, and a control terminal coupled with the voltage control node Vctl_1 to receive the voltage control signal Vctl_out from the shared voltage control circuit 305. The components of regulator 1 further comprise (2) a current regulation loop coupled between the second terminal of the current sensing transistor Msens and a control terminal of the pass transistor Mpass. In the illustrated example, the current regulation loop includes current mirror circuits comprising current mirror transistors M2a/M2b, M3a/M3b, and M4/Mpass and one or more current summation circuits comprising a current source Ia coupled with a voltage aVdd.

Likewise, in this example, the components of regulator 2 further include (1) a current sensing transistor Msens having a first terminal coupled with the second terminal of the pass transistor Mpass at the output of regulator 2, a second terminal to output a loop current I2 complementary to a load current at the output node of regulator 2, and a control terminal coupled with the voltage control node Vctl_2 to receive the voltage control signal Vctl_out from the shared voltage control circuit 305. The components of regulator 2 further include (2) a current regulation loop coupled between the second terminal of the current sensing transistor Msens and a control terminal of the pass transistor Mpass. In the illustrated example, the current regulation loop includes current mirror circuits comprising current mirror transistors M2a/M2b, M3a/M3b, and M4/Mpass and one or more current summation circuits comprising a current source Ib coupled with a voltage aVdd. It is to be understood that other well-known linear regulator topologies and current control circuits could be used. In this example, current through different sensing transistors are complementary to the load current in the sense that as the load current changes, the current through the sense transistor changes in an opposite direction (e.g., if the load current of regulator 1 increases, then current I1 decreases, and if the load current of regulator 1 decreases, then the current I1 increases).

In addition, the error amplifier 320 output node Vctl_out is selectively coupled with the gate terminals of the current sensing transistors Msens in the regulators 1 and 2 to drive the respective voltage control node, Vctl_1 or Vctl_2, to a value to correct the error in the output voltage Vout1 or Vout2 of regulators 1 and 2, respectively. The output node of the error amplifier 320 may drive the control terminal (e.g., gate terminal) of the current sensing transistor Msens based on the regulator output voltages Vout1 or Vout2. For example, when more load current is needed (e.g., due to load transients) the regulator output voltages Vout1 or Vout2 may decrease. In response, the shared voltage control circuit 305 may drive the control terminal of Msens to a higher value to reduce its gate-to-source voltage Vgs, reduce the current through Msens, and increase the output current at the output Vout1 or Vout2, respectively, which corrects the output voltage error introduced by the transient load current.

Further details regarding the configuration and operation of the current control circuits can be found in U.S. patent application Ser. No. 14/928,703, entitled "Dual Loop Regulator Circuit," and filed on Oct. 30, 2015, the disclosure of which is expressly incorporated herein by reference in its entirety.

Similar to circuit 200B in FIG. 2B, circuit 300 further includes a set of buffer circuits 330 and 332 each having an input terminal coupled to the voltage control node Vctl_1 or Vctl_2 of the regulators and an output terminal that can be selectively coupled with the voltage control signal Vctl_out output from the shared voltage control circuit 305 via the third set of switches S1c and S2c. The third set of switches S1c and S2c may be configured to selectively couple the internal control voltages of the voltage control nodes, Vctl_1 or Vctl_2, of the respective regulator circuits with the voltage control signal Vctl_out of the shared voltage control circuit 305 via the buffer circuits 330 and 332. This may be done to precharge the output voltage control node of the shared voltage control circuit 305 before the internal voltage control node, Vctl_1 or Vctl_2, is selectively coupled with the output node of the shared voltage control circuit 305. Switch S1c may be selectively coupled between the output terminal of buffer circuit 330 and the output node of the shared voltage control circuit 305 and switch S2c may be selectively coupled between the output terminal of buffer circuit 332 and the output node of the shared voltage control circuit 305. Switch S1c may be configured to selectively couple the control voltage on internal control node Vctl_1 of regulator 1 with the Vctl_out of the shared voltage control circuit 305 to precharge the voltage control signal Vctl_out to a value approaching the control voltage of Vctl_1 during a clock interval before switch S1*b* is activated to selectively couple the voltage control signal Vctl_out with the internal voltage control node Vctl_1 of regulator 1. Likewise, switch S2*c* may be configured to selectively couple the control voltage on internal control node Vctl_2 of regulator 2 with the Vctl_out of the shared voltage control circuit 305 to precharge the voltage control signal Vctl_out to a value approaching the control voltage of Vctl_2 during a clock interval before switch S2*b* selectively couples the voltage control signal Vctl_out with the internal voltage control node Vctl_2 of regulator 2.

Figure 3B:
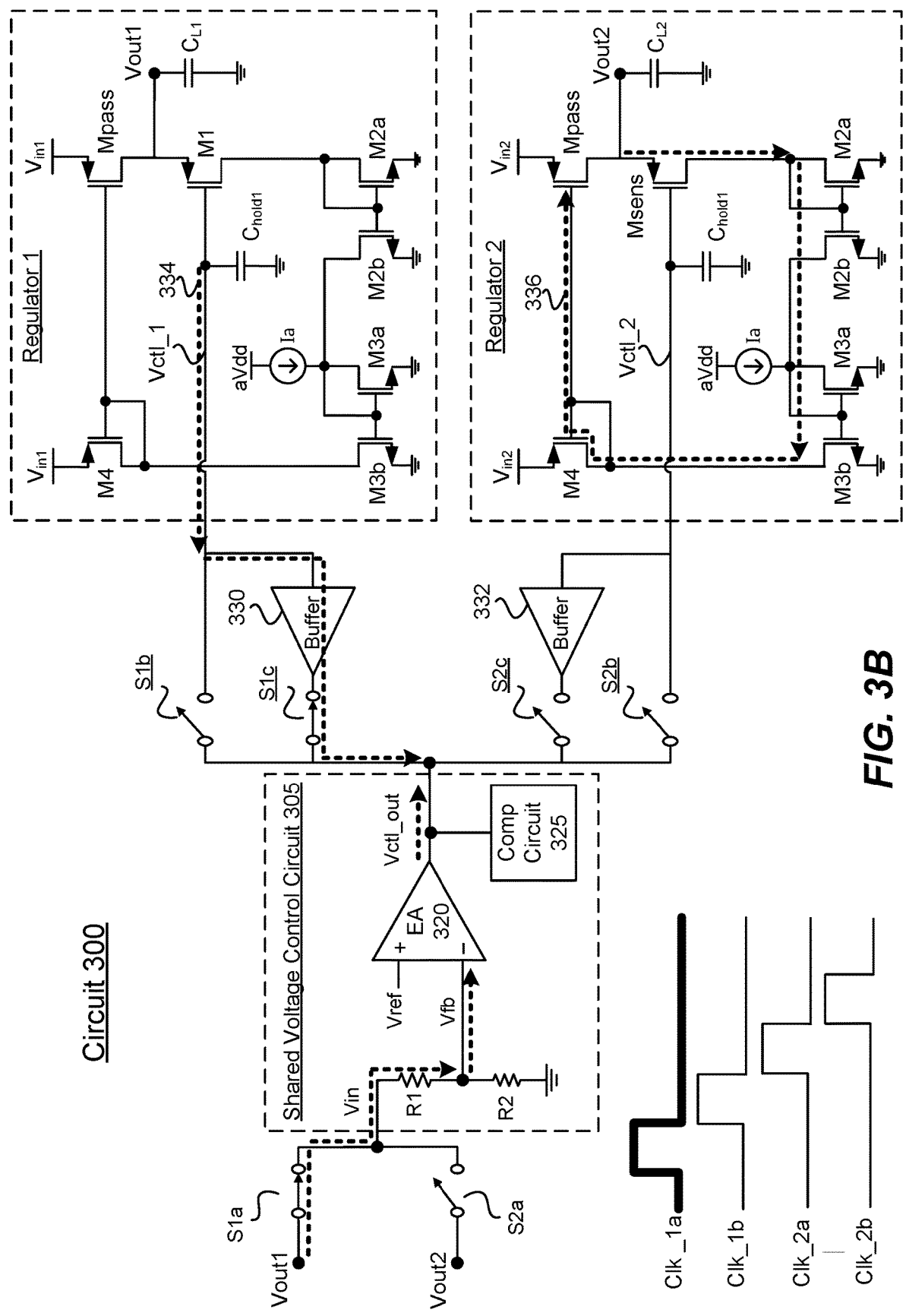

An example precharge cycle is shown in FIG. 3B, which depicts a block diagram of an exemplary precharge cycle for a circuit 300 configured in accordance with aspects of the present disclosure. In the illustrated example, the precharge cycle is implemented during a first clock interval clk_1*a*. The first clock interval clk_1*a* is shown as active while other clock intervals clk_1*b*, clk_2*a*, and clk_2*b* are shown as inactive. When clk_1*a* is active, switch S1*c* may be closed to form a connection while switches S1*b*, S2*b*, and S2*c* may be open. In response, the output of a first buffer circuit 330 may be selectively coupled with the output node of shared voltage control circuit 305 via switch S1*c* during this first clock interval clk_1*a*.

As shown, voltage Vctl_1 of regulator 1 is coupled through buffer circuit 330 to precharge the output node of the shared voltage control circuit 305 to a value approaching the voltage at Vctl_1. This may be done during a clock interval before the voltage control node Vctl_1 is selectively coupled with a voltage control signal Vctl_out via switch S1*b* in a subsequent clock interval. In addition, a switch S1*a* may be closed during both the first clock interval clk_1*a* as well as the second clock interval clk_1*b* to provide sufficient time for a regulated output signal Vout1 to propagate through an error amplifier 320 to the output node of a shared voltage control circuit 305.

Likewise, during a different clock interval, such as clk_2*a* for example (not shown), the switch S2*c* may be closed to form a connection while switches S1*b*, S1*c*, and S2*b* may be open. Thus, switch S2*c* may selectively couple the output of buffer circuit 332 with the output node of the shared voltage control circuit 305 to precharge it to a value approaching the voltage at Vctl_2. In addition, the switch S2*a* may be closed during both the first clock interval clk_2*a* and a second clock interval clk_2*b* to provide sufficient time for the regulated output signal Vout2 to propagate through the error amplifier 320 to the output node Vctl_out of the shared voltage control circuit 305.

This example further illustrates a current control circuit. As mentioned above, transient currents experienced at the output of the regulators 1 or 2 may be regulated by the current control circuit comprising a current regulation loop of each of the regulators, for example. For instance, the current control circuits may maintain closed loop control of a regulator even when the shared voltage control circuit 305 is controlling another regulator. This is depicted by loop current 336 in the current regulation loop of regulator 2 to regulate transient current at the output Vout2 of regulator 2. Such transient current response may likewise be active in the current regulation loop of regulator 1 (e.g., loop current 334). In this example, the transient current response of regulators 1 and 2 may be active during the precharging cycle, a voltage control cycle, and when a particular regulator is de-coupled from the shared voltage control circuit 305, for example.

Figure 3C:
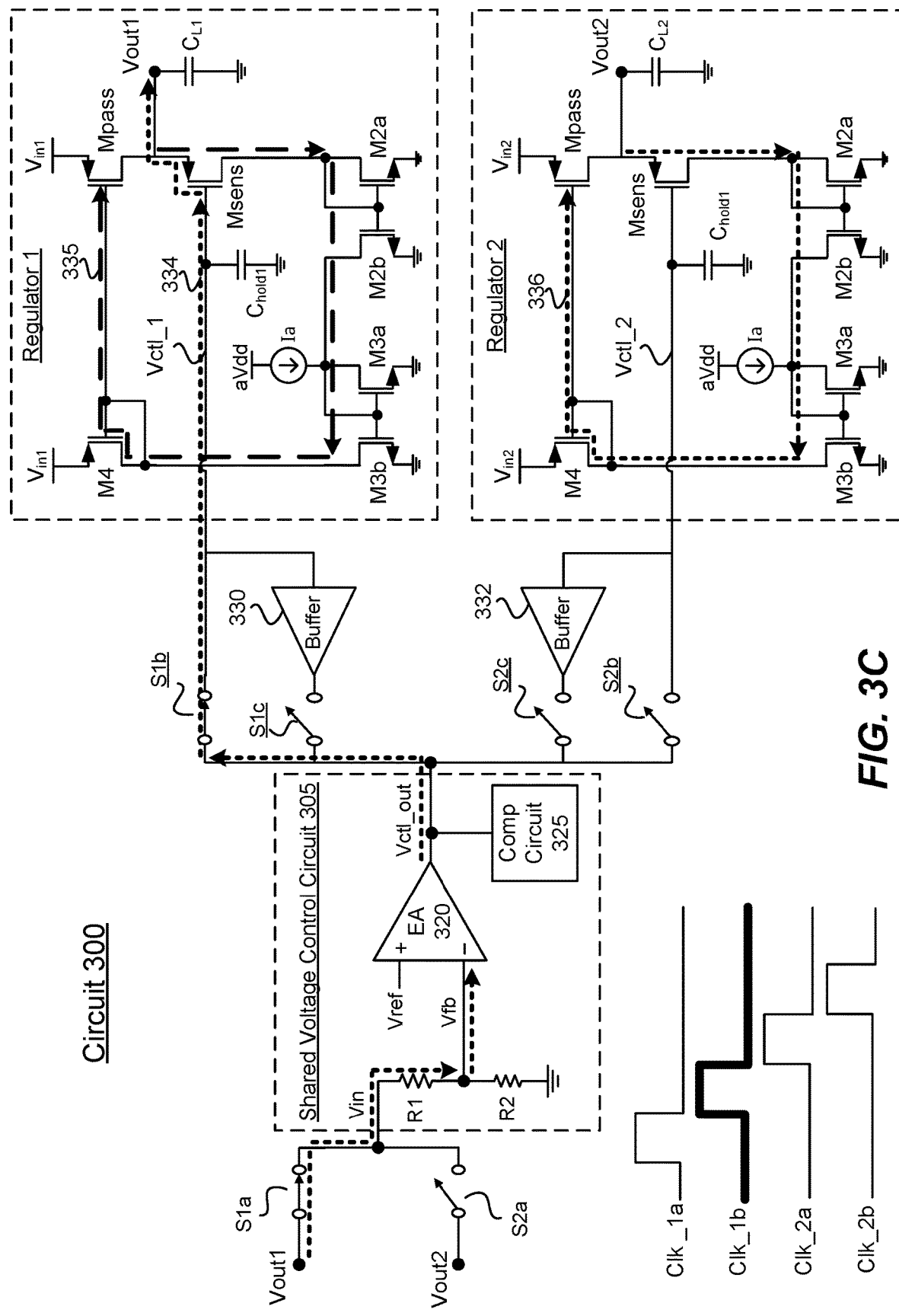

FIG. 3C depicts a block diagram of an example voltage control cycle for a circuit 300 configured in accordance with aspects of the present disclosure. In the illustrated example, the voltage control cycle is implemented during a second clock interval clk_1*b* of multiple clock intervals. The second clock interval clk_1*b* is shown as active while other clock intervals clk_1*a*, clk_2*a*, and clk_2*b* are shown as inactive.

When clk_1*b* is active, switch S1*b* may be closed to form a connection while switches S1*c*, S2*b*, and S2*c* may be open. In response, a voltage control signal Vctl_out output from a shared voltage control circuit 305 may be selectively coupled with an input voltage control node Vctl_1 of regulator 1 via switch S1*b* during this second clock interval clk_1*b*. In this case, Vctl_out from the output node of the shared voltage control circuit 305 is coupled to the voltage control node Vctl_1 of regulator 1 to set the control voltage node Vctl_1 to a value to regulate output voltage Vout1 of regulator 1 in response to the value of the voltage control signal Vctl_out. This may be done during a clock interval after the output node of the shared voltage control circuit 305 is precharged as discussed above. Thus, during the second clock interval clk_1*b*, the voltage control node Vctl_1 may be selectively coupled with the precharged voltage control signal Vctl_out on the output node of the shared voltage control circuit 305 via switch S1*b*. As above, switch S1*a* may be closed during both the first clock interval clk_1*a* as well as the following second clock interval clk_1*b* to provide sufficient time for the regulated output signal Vout1 to propagate through error amplifier 320 to the output node of the shared voltage control circuit 305.

Likewise, during a different clock interval, such as clk_2*b* for example (not shown), the switch S2*b* may be closed to form a connection while switches S1*b*, S1*c*, and S2*b* may be open. In response, the voltage control signal Vctl_out output from the shared voltage control circuit 305 may be selectively coupled with input voltage control node Vctl_2 of regulator 2 via switch S2*b* during this clock interval clk_2*b*. In this case, the voltage control signal Vctl_out from the output node of the shared voltage control circuit 305 would be conducted into the voltage control node Vctl_2 of regulator 2 to set the control voltage node Vctl_2 to a value to regulate output voltage Vout2 of regulator 2 in response to the value of the voltage control signal Vctl_out. This may be done during a clock interval after the output node of the shared voltage control circuit 305 is precharged as discussed above. Thus, during the clock interval clk_2*b*, the voltage control node Vctl_2 may be selectively coupled with the precharged voltage control signal Vctl_out on the output node of the shared voltage control circuit 305 via switch S2*b*. In addition, switch S2*a* may be closed during both the first clock interval clk_2*a* as well as the second clock interval clk_2*b* to provide sufficient time for the regulated output signal Vout2 to propagate through error amplifier 320 to the output node of the shared voltage control circuit 305.

Additionally, any transient current experienced at the output of the regulators 1 or 2 may be regulated by the current control circuit comprising a current regulation loop of each of the regulators. This is depicted by loop currents 335 and 336 in the current regulation loops of regulator 1 and regulator 2, respectively, to regulate transient current at the output of the regulators. The loop currents 335 and 336 (may also be referred to as transient response currents) of regulators 1 and 2 may conduct during either the precharging cycle or a voltage control cycle, or both, and may further maintain a current regulation loop when each regulator is disconnected from the shared voltage control circuit, for example.

Figure 3D:
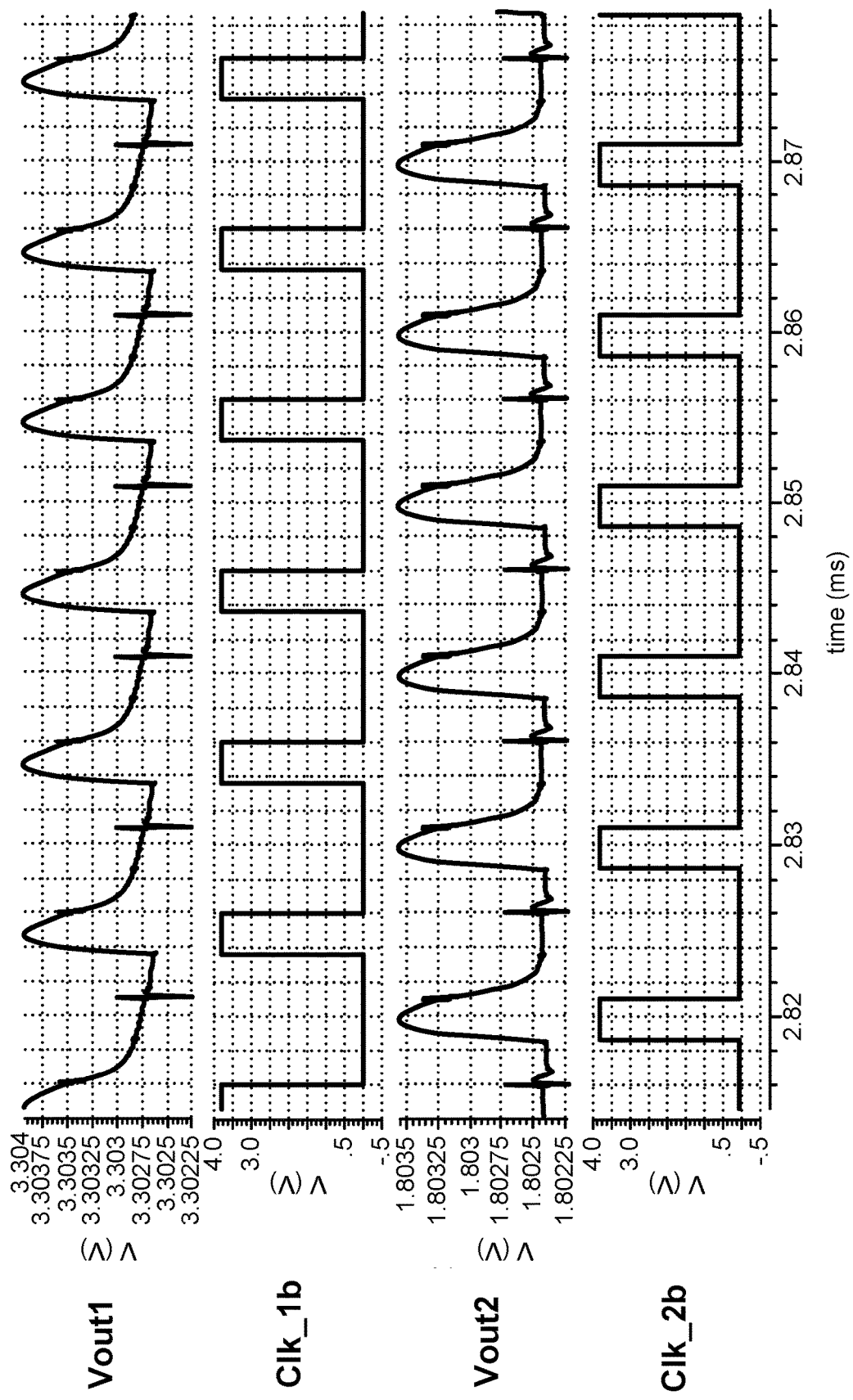
FIG. 3D depicts a graph of an example transient response for the circuit configuration for controlling regulator circuits in accordance with the present disclosure.

FIG. 3D depicts a graph of an example transient response for a circuit 300 for controlling regulator circuits configured in accordance with the described techniques. In the example of FIG. 3D, the transient response for circuit 300 includes a graph of a regulated output voltage signal Vout1 of regulator 1 operating according to clock interval clk_1b shown in FIGS. 3B and 3C and a regulated output voltage signal Vout2 of regulator 2 operating according to clock interval clk_2b of FIGS. 3B and 3C.

As shown, the clock intervals clk_1b and clk_2b each have a clock period of approximately 0.01 millisecond (ms) and are each active for a clock interval of approximately ⅕ of the clock period and inactive for the other ⅘ of the clock period. In this example, the regulated voltage Vout1 of regulator 1 varies between 3.304 volts at the high end when clk_1b is in an active state and approximately 3.3025 at the low end at the end of the inactive state for clk_1b. Likewise, the regulated voltage Vout2 of regulator 2 varies between a different voltage, 1.8035 volts, at the high end when clk_2b is in an active state and approximately 1.8025 at the low end at the end of the inactive state for clk_2b.

The values mentioned above are exemplary. The described aspects may be adapted to regulate multiple different regulated voltages, which may have different values, for example, for different regulators at different clock intervals using a shared voltage control circuit.

Figure 4A:
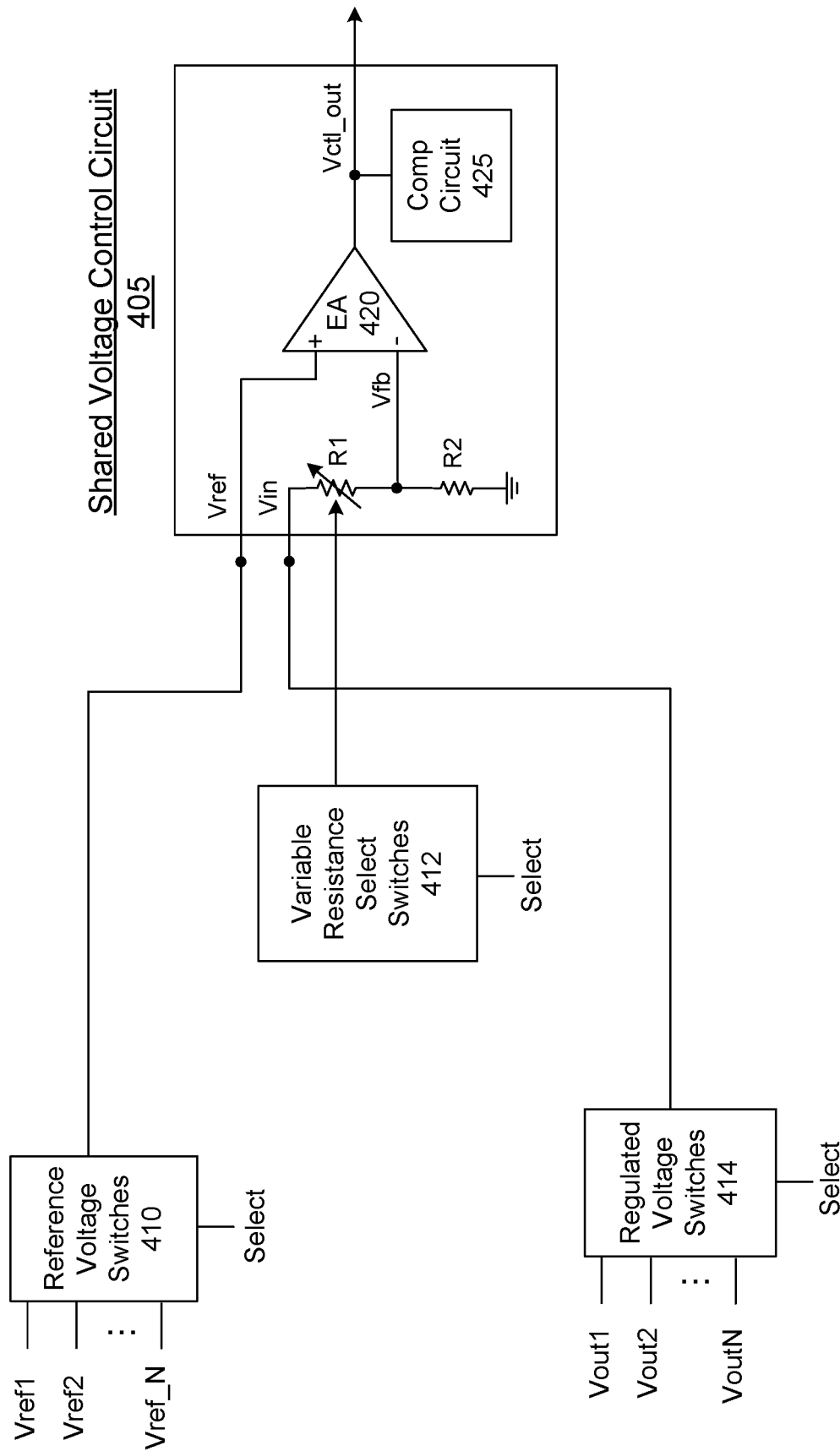
FIG. 4A depicts an example block diagram of a shared voltage control circuit configuration for use with multiple regulated voltages at different voltage levels in accordance with aspects of the present disclosure.

FIG. 4A depicts an example block diagram of a shared voltage control circuit configuration for use with multiple regulated voltages at different voltage levels in accordance with aspects of the present disclosure. Circuit 400A includes multiple sets of selection switches coupled with a shared voltage control circuit 405. The shared voltage control circuit 405 comprises a regulated voltage input Vin, a resistor divider comprising variable resistor R1 and resistor R2 to receive the input voltage Vin and to provide a feedback voltage signal Vfb, a reference voltage input Vref, and an error amplifier 420.

The error amplifier 420 may be adapted to receive a regulated voltage, Vout1, Vout2, . . . , VoutN, through a resistor divider (e.g., R1 and R2) at a first input, receive a corresponding reference voltage, Vref1, Vref2, . . . , VrefN, at a second input, compare the input regulated voltage with the corresponding reference voltage, and provide a voltage control signal Vctl_out at the output of the shared voltage control circuit 405 in response to comparing the voltages. The shared voltage control circuit 405 further comprises a compensator circuit 425 coupled with the output node and configured to stabilize the voltage control signal Vctl_out at the output.

In cases where the regulated output voltages of the regulators are at different voltage values, different reference voltages, Vref1, Vref2, . . . , VrefN, may be supplied to the reference voltage input Vref of the shared voltage control circuit 405. A set of reference voltage switches 410 may provide the selection logic to supply the appropriate reference voltage to the input of the error amplifier 420. The set of reference voltage switches 410 are coupled to receive a select signal, Select, for example, to selectively couple the appropriate one of the reference voltages, Vref1, Vref2, . . . , VrefN, with the reference voltage input of the shared voltage control circuit 405. In one aspect, the set of reference voltage switches 410 may be implemented as a multiplexer circuit.

In this example, variable resistance in the feedback resistor may be adjusted using a set of variable resistance select switches 412. Variable resistor R1 may be implemented using any known technique for providing a variable resistance. In some aspects, a resistor ladder (not shown) may be used to provide the variable resistance value of variable resistor R1 as appreciated by persons of skill in the art. As such, the variable resistance select signal, Select, may be utilized to select in or select out one or more resistors in the resistor ladder to provide the appropriate resistance value for the variable resistor R1.

If different regulator circuits are generating different regulated output voltages, Vout1, Vout2, . . . , VoutN, then it may be desirable to either modify the feedback divider ratio or modify the reference voltage, or both, when different regulator circuits are configured in a closed voltage feedback loop with the shared voltage control circuit 405 to regulate the outputs at the desired voltages. For example, when a first regulator is switching into a closed loop with shared voltage control circuit 405 (e.g., by changing the Select signal, which may be a clock interval), Vout1 may be coupled to Vin. At the same time, either the resistor divider ratio or the reference voltage, or both, may be switched to new values so the error amplifier produces an error signal, Vctl_out, to maintain the active regulator at the desired output voltage. As different regulators with different output voltages are switched into the voltage control loop, different resistor divider values and/or different reference voltages may be used to maintain the different regulator output voltages, for example.

Figure 4B:
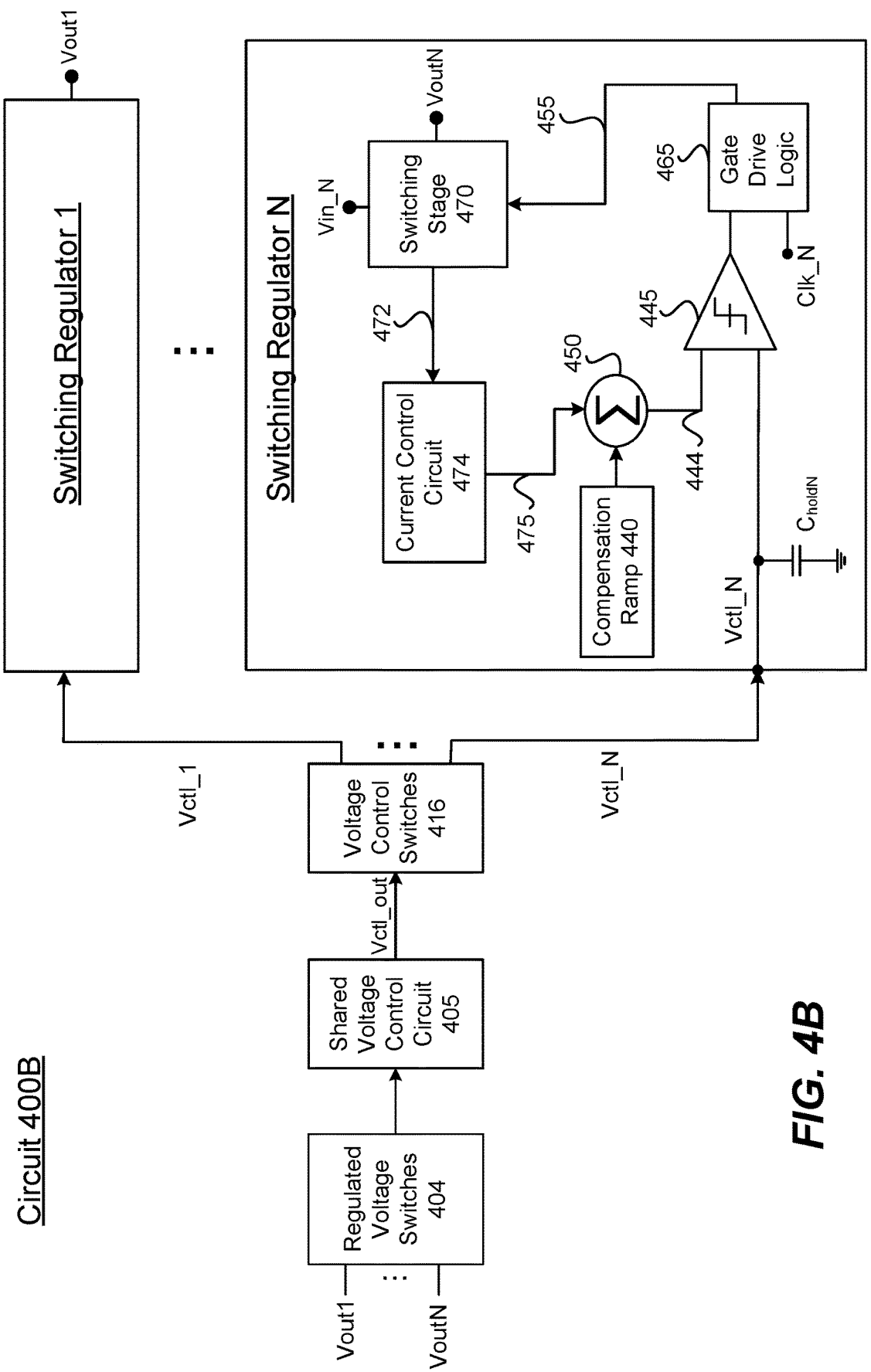
FIG. 4B depicts a block diagram of an exemplary shared voltage control circuit configuration for use with switching regulators in accordance with aspects of the present disclosure.

FIG. 4B depicts an example block diagram of a shared voltage control circuit selectively coupled with multiple switching regulators. In the illustrated example, circuit 400B includes a shared voltage control circuit 405 configured to be selectively coupled with switching regulators 1 to N via a set of voltage control switches 416. The shared voltage control circuit 405 is configured to selectively receive regulated voltages, Vout1, . . . , VoutN through a set of regulated voltage switches 404, for example, and to output a voltage control signal Vctl_out to the set of voltage control switches 416.

The set of regulated voltage switches 404 is configured to receive the regulated output voltages Vout1, . . . , VoutN from the outputs of the switching regulators and to output a selected one of the regulated output voltages to the input of the shared voltage control circuit 405. The set of voltage control switches 416 is configured to receive the voltage control signal Vctl_out output from the shared voltage control circuit 405 and to output a selected one of the control voltages, Vctl_1, . . . , Vctl_N to different switching regulators. Switches 404 and 416 may be controlled using multiple clock phases, for example, as described above. Accordingly, the switching regulator circuits 1 to N are configured in a closed voltage regulation loop at different time intervals.

In the illustrated example, switching regulator N comprises an input voltage control node adapted to receive the voltage control signal Vctl_N and an internal capacitance CholdN coupled with the input voltage control node. The value of the received voltage control signal Vctl_N may be stored by the internal capacitance CholdN. The control voltage signal Vctl_N may be received by one input of a comparator circuit 445.

The other input of the comparator circuit 445 may receive output signal 444 (e.g., a voltage) from a summation circuit 450. The summation circuit 450 may be configured to add (or subtract) a ramp signal generated by a compensation ramp 440 to a sensed output current signal 475 output from a current control circuit 474. The output signal 444 thus comprises the ramp signal modified by (e.g., added to or subtracted from) the sensed output current signal 475. As shown, the comparator 445 may be implemented using an amplifier circuit.

The output of the comparator 445 is provided to gate drive logic 465, which provides an output select signal 455 to selectively activate or deactivate switching stage 470 of the switching regulator N. Gate drive logic 465 may be implemented as any of a number of sequential logic circuits including a set/reset latch, a flip flop, or other combinational logic circuit, for example. In this example, gate drive logic 465 combines the output of the comparator circuit 445 with an input clock signal, clk_N.

The switching stage 470 of the switching regulator N receives an input voltage Vin_N and provides an output voltage VoutN. The output select signal 455 is configured to open or close one or more switches (not shown) within the switching stage 470 to regulate the output voltage signal VoutN.

The switching stage 470 of the switching regulator N generates a feedback current signal 472 based on a sensed current in the switching regulator and outputs it to the current control circuit 474. In one aspect, the current control circuit 474 comprises a current sense circuit (not shown) adapted to sense current in the switching stage 470 of the switching regulator N and to provide the sensed output current signal 475 in response. This sensed output current signal 475 is then provided to the summation circuit 450, which combines the sensed output current signal 475 with the ramp signal output from the compensation ramp 440. The resulting signal 444 is then provided to the other input of the comparator circuit 445 and compared with the input voltage control signal Vctl_N as discussed above.

The output of the comparator circuit 445 is provided to the gate drive logic 465. The gate drive logic 465 receives an input clock signal or one or more portions, and generates the select signal 455, which is output to the switching stage 470 of the switching regulator N.

Figure 4C:
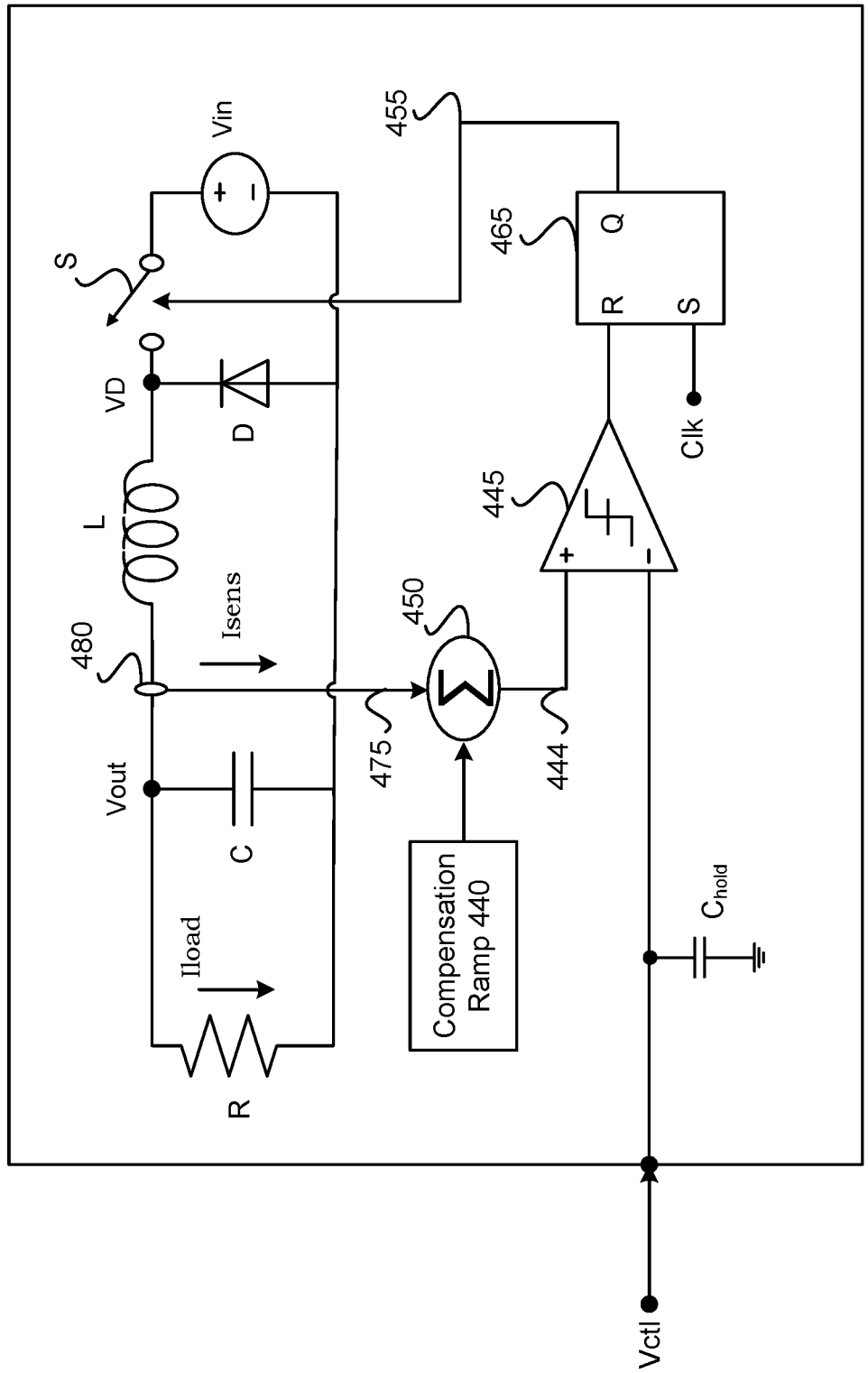
FIG. 4C depicts a block diagram of an exemplary switching regulator for use in accordance with aspects of the present disclosure.

FIG. 4C depicts a block diagram of an exemplary switching regulator for use in accordance with aspects of the present disclosure. In the illustrated example, switching regulator 400C is configured to receive a voltage control signal Vctl output from a shared voltage control circuit 405 (not shown). The switching regulator 400C comprises an input voltage control node adapted to receive the voltage control signal Vctl and an internal capacitance Chold coupled with the input voltage control node. The value of the received voltage control signal Vctl may be stored by the internal capacitance Chold. The control voltage signal Vctl may be received by one input of a comparator circuit 445.

The other input of the comparator circuit 445 may receive output signal 444 from the summation circuit 450. The summation circuit 450 may be configured to add (or subtract) the ramp signal output from a compensation ramp 440 to a sensed current Isens on the sensed output current signal 475 from a current sensing circuit 480. The output signal 444 thus comprises the ramp signal modified by (e.g., added to or subtracted from) the sensed output current Isens.

In this particular example, the output of the comparator 445 is provided to gate drive logic 465, such as a set/reset latch, which provides an output select signal 455 to selectively activate or deactivate one or more switches S of the switching regulator 400C. The switching regulator 400C is configured to receive an input voltage Vin and provide an output voltage Vout in response. The select signal 455 is configured to open or close switch S within the switching regulator 400C to regulate the output voltage signal Vout.

The switching regulator 400C further comprises an inductor L coupled between the switch S and the output voltage Vout. The inductor L has a first terminal coupled with a switching node having a switching voltage VD and a second terminal coupled with the output voltage Vout. The switching regulator 400C also comprises a diode D coupled between the switching node and ground to provide inductor current to the inductor when the switch S is in an open position and the input voltage Vin is disconnected. The diode D may alternatively be implemented as a switch (e.g., a low side switching transistor).

In this example, the current sensing circuit 480 is illustrated at the output of inductor L, but it is to be understood that different current sensing circuits may sense input current, output current, or current in one of the switching transistors as is known in the art. In this example, the current sensing circuit 480 is configured to sense the current conducting in the inductor L and to provide the sensed current signal Isens on the sensed output current signal 475 to the summation circuit 450. The switching regulator 400C further comprises a capacitor C coupled across the output of the switching regulator that holds the regulated output voltage Vout and a load modeled here as a resistor R that conducts a load current Iload.

The current sensing circuit 480 is adapted to sense the current conducting in the inductor L and to provide the sensed current signal Isens in response. This sensed current Isens is then output on signal 475 to the summation circuit 450, which modifies the sensed current signal Isens by the ramp signal output from the compensation ramp 440. The resulting signal 444 is then provided to the other input of the comparator circuit 445 and compared with the input voltage control signal Vctl as discussed above.

The output of the comparator circuit 445 is provided to gate drive logic 465, such as a set/reset latch. The gate drive logic 465 also receives an input clock signal Clk (or one or more portions thereof) and generates the select signal 455, which is output to the control terminal of the one or more switches S of the switching regulator 400C.

Figure 5A:
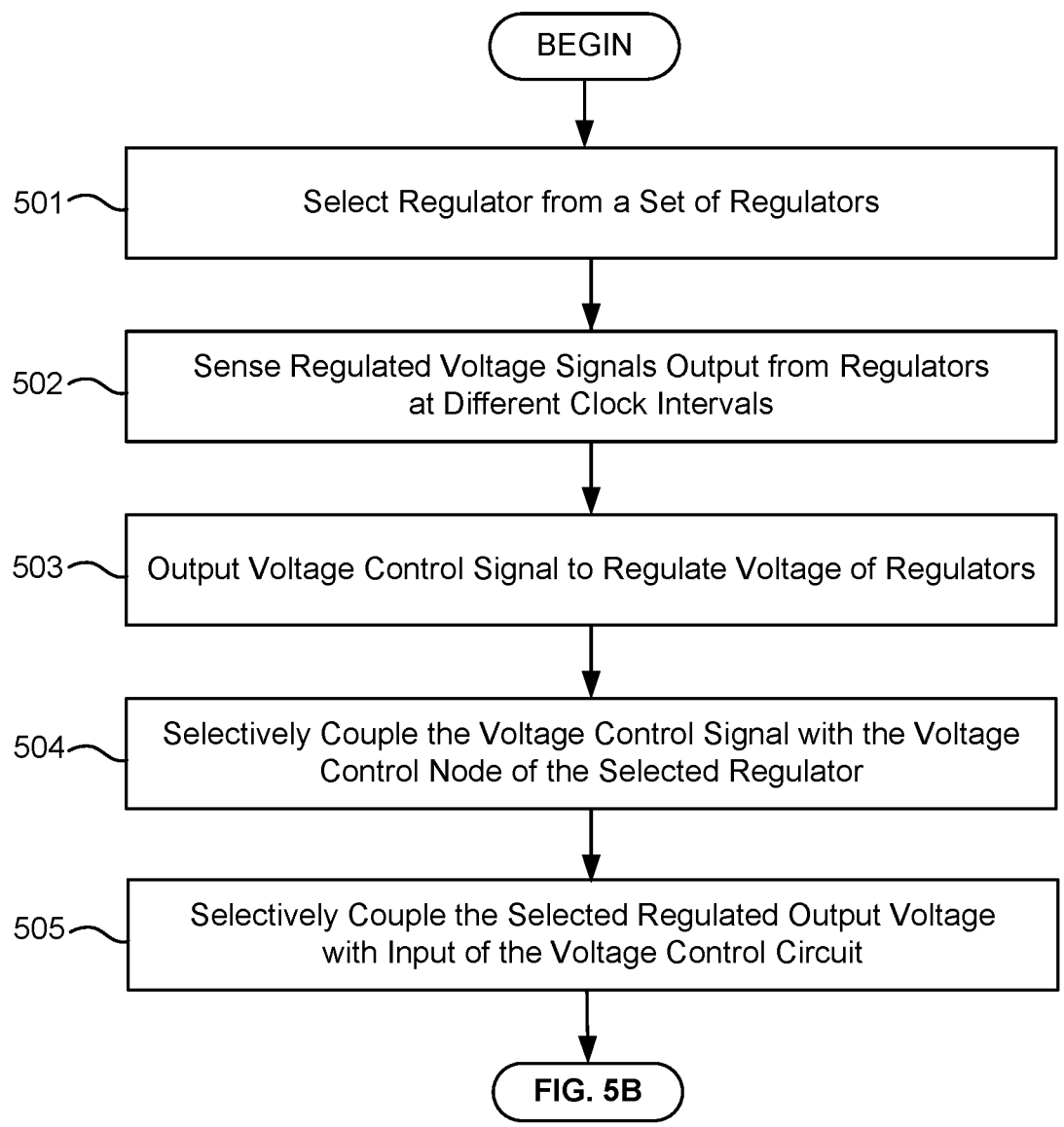
FIGS. 5A-5B depict flow charts of exemplary processes for time sharing a voltage control circuit across regulator circuits according to the techniques described with reference to the circuit configuration of FIGS. 3A-3C.
Figure 5B:
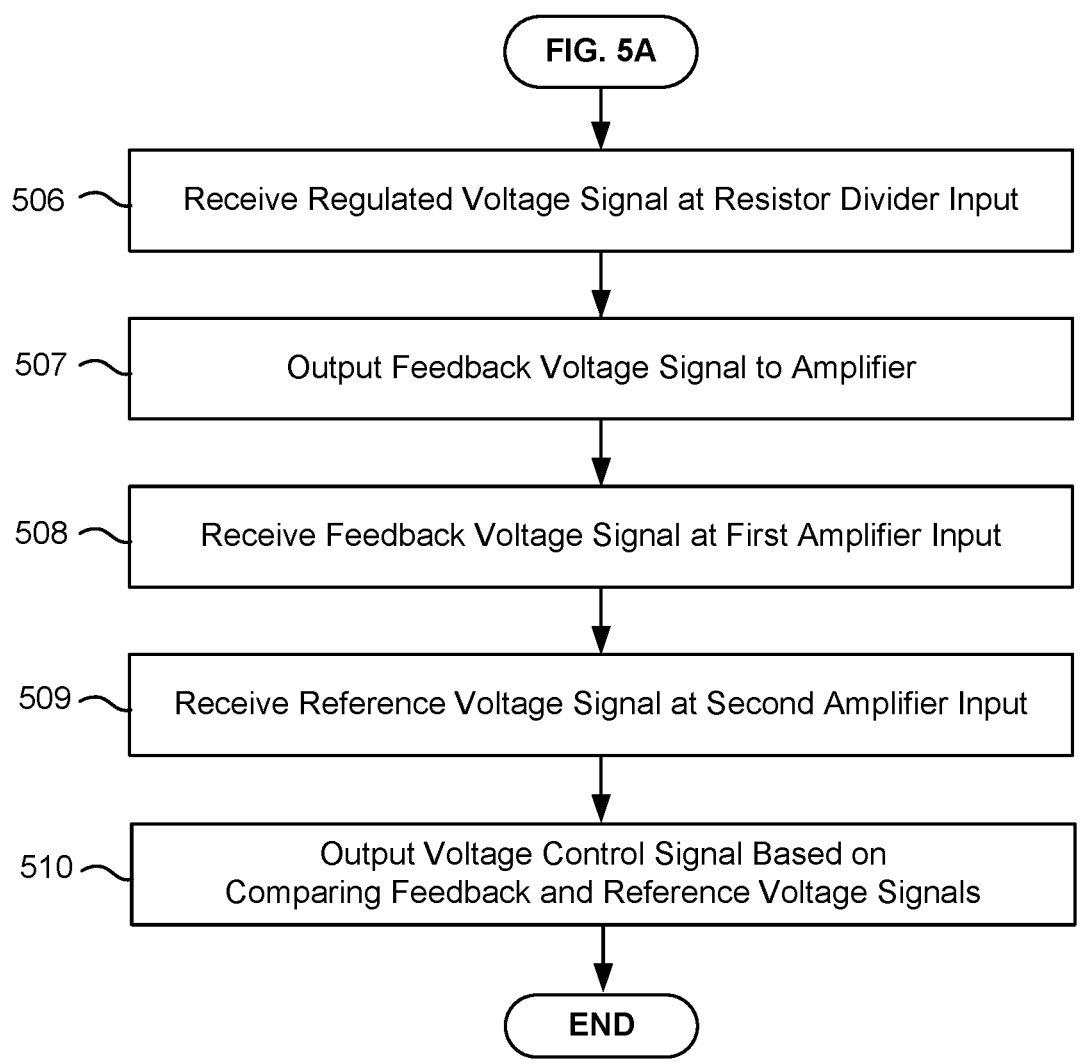

FIGS. 5A-5B depict flow charts of an exemplary process for time sharing a voltage control circuit across multiple regulator circuits according to the techniques described with reference to the circuit configuration of FIGS. 3A-3C. The following figures depict example flow charts illustrating various aspects of a process for generating regulated voltages according to the described techniques. It is noted that the processes described below are exemplary in nature and are provided for illustrative purposes and not intended to limit the scope of the disclosure. For instance, methods in accordance with some aspects may include or omit some or all of the operations described below, or may include steps in a different order than described. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

FIG. 5A depicts a method for controlling multiple regulator circuits each configured to receive an input voltage control signal and to output a regulated voltage signal. Each regulator circuit comprises a capacitor coupled with a voltage control node to store a control voltage. In the illustrated example, process 500 begins at operation 501, selecting one of the regulators. Process 500 continues by sensing regulated voltage signals output from each of the regulator circuits at an input of a voltage control circuit during separate ones of the discrete clock intervals (operation 502), and outputting a voltage control signal from the voltage control circuit having an output node coupled with the voltage control nodes of the regulator circuits to regulate the voltage of the regulator circuits in response to sensing the regulated voltage signals (operation 503). Process 500 continues by selectively coupling the voltage control signal output from the voltage control circuit with a selected one of the voltage control nodes of the regulator circuits (operation 504), and selectively coupling a selected one of the regulated voltage signals output from the regulator circuits with the input of the voltage control circuit (operation 505). In some aspects, the output node of the voltage control circuit may also be precharged before selectively coupling the voltage control signal from the voltage control circuit to each voltage control node.

Process 500 continues at FIG. 5B, which illustrates flow charts of an exemplary process for time sharing a voltage control circuit across multiple regulator circuits according to the techniques described with reference to the circuit configuration of FIGS. 3A-3C. In the illustrated example, process 500 continues by receiving the regulated voltage signals output from the regulator circuits at a resistor divider circuit (operation 506) and outputting a feedback voltage signal to an amplifier in response (operation 507). Process 500 may then receive the feedback voltage signal at a first input of an amplifier coupled with the resistor divider network (operation 508), receive a reference voltage signal at a second input of the amplifier (operation 509), and output the voltage control signal based on comparing the feedback voltage signal with the reference voltage signal (operation 510).

Figure 6:
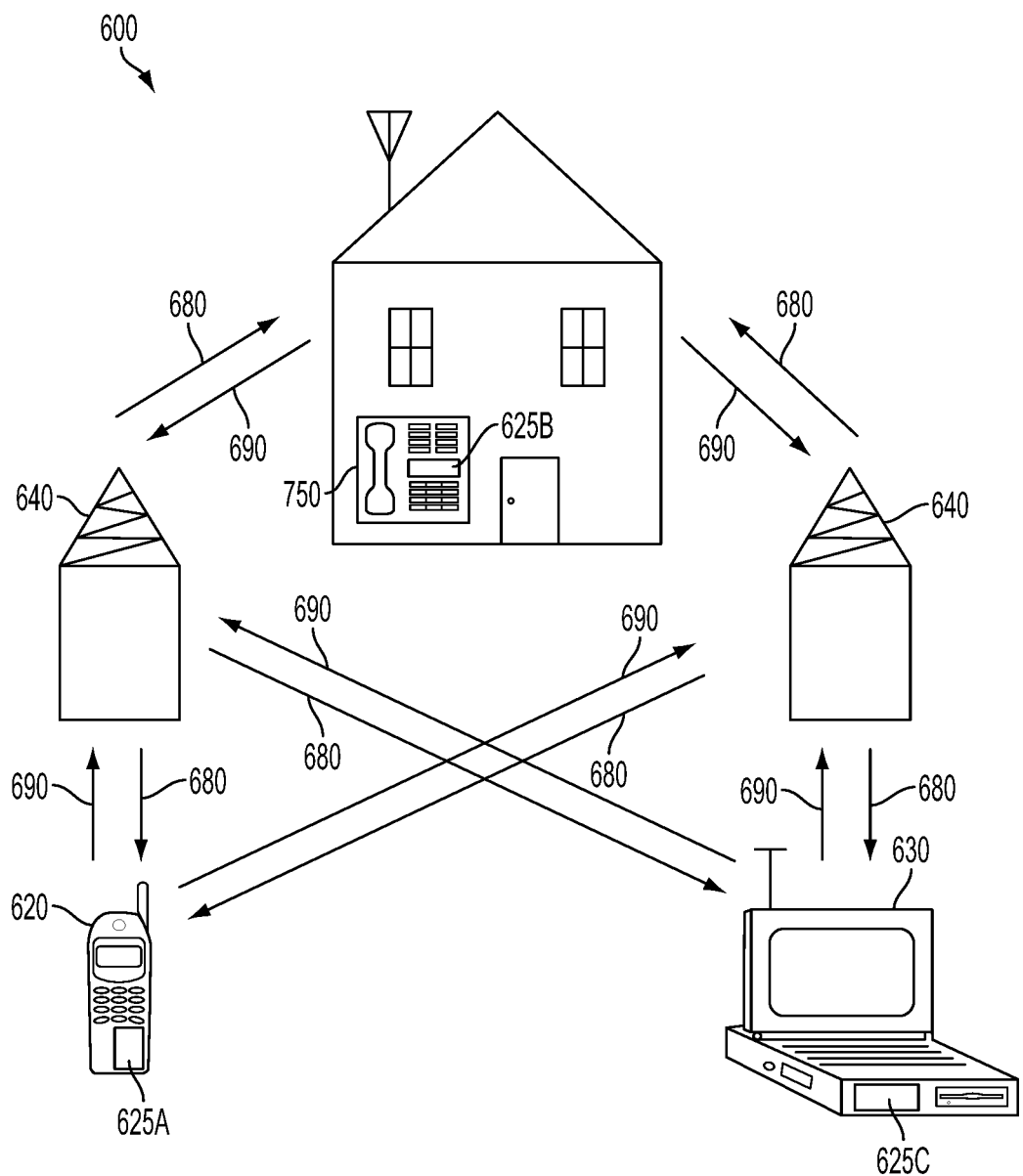
FIG. 6 is a block diagram showing an exemplary wireless communication system in which an aspect of the disclosure may be advantageously employed.

FIG. 6 is a block diagram showing an exemplary wireless communication system 600 in which an aspect of the disclosure may be advantageously employed. For purposes of illustration, FIG. 6 shows three remote units 620, 630, and 650 and two base stations 640. It will be recognized that wireless communication systems may have many more remote units and base stations. Remote units 620, 630, and 650 include IC devices 625A, 625C, and 625B that include the disclosed shared voltage control circuit. It will be recognized that other devices may also include the disclosed voltage control circuit, such as the base stations, switching devices, and network equipment. FIG. 6 shows forward link signals 680 from the base station 640 to the remote units 620, 630, and 650 and reverse link signals 690 from the remote units 620, 630, and 650 to base station 640.

In FIG. 6, remote unit 620 is shown as a mobile telephone, remote unit 630 is shown as a portable computer, and remote unit 650 is shown as a fixed location remote unit in a wireless local loop system. For example, a remote unit may be a mobile phone, a hand-held personal communication systems (PCS) unit, a portable data unit such as a personal digital assistant (PDA), a GPS enabled device, a navigation device, a set top box, a music player, a video player, an entertainment unit, a fixed location data unit such as a meter reading equipment, or other communications device that stores or retrieve data or computer instructions, or combinations thereof. Although FIG. 6 illustrates remote units according to the aspects of the disclosure, the disclosure is not limited to these exemplary illustrated units. Aspects of the disclosure may be suitably employed in many devices, which include the disclosed shared voltage control circuit.

Throughout the foregoing description, for the purposes of explanation, numerous specific details were set forth in order to provide a thorough understanding of the invention. It will be apparent, however, to persons skilled in the art that these aspects may be practiced without some of these specific details. The above examples and embodiments should not be deemed to be the only embodiments, and are presented to illustrate the flexibility and advantages of the present invention. Other arrangements, embodiments, implementations and equivalents will be evident to those skilled in the art and may be employed without departing from the spirit and scope of the invention as defined by the following claims.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A circuit comprising:
   a plurality of regulator circuits each configured to receive a voltage control signal, and to output a regulated voltage signal, each regulator circuit comprising a capacitor coupled with the voltage control node to store a control voltage;
   a voltage control circuit having an output selectively coupled with the voltage control nodes of the plurality of regulator circuits, the voltage control circuit having an input configured to sense regulated voltage signals output from the plurality of regulator circuits and to output the voltage control signal to set the control voltages of the plurality of regulator circuits;
   at least one buffer circuit having a buffer circuit input and a buffer circuit output;
   a first set of switches configured to selectively couple the output of the voltage control circuit with a selected one of the voltage control nodes of the plurality of regulator circuits via the at least one buffer circuit to precharge a compensation capacitor coupled to the output of the voltage control circuit with the stored control voltage of the selected voltage control node before the voltage control signal is coupled to the selected one of the voltage control nodes; and
   a second set of switches configured to selectively couple a selected one of the regulated voltage signals output from the plurality of regulator circuits with the input of the voltage control circuit.

2. The circuit of claim 1, wherein the at least one buffer circuit is one of a plurality of buffer circuits; and
   wherein the buffer circuit input of the at least one buffer circuit is coupled with at least one voltage control node of the plurality of regulator circuits and the buffer circuit output of the at least one buffer circuit is coupled with the voltage control circuit to precharge the compensation capacitor coupled to the output of the voltage control circuit.

3. The circuit of claim 2, further comprising a third set of switches configured to selectively couple the voltage control nodes of the plurality of regulator circuits with the output of the voltage control circuit through the plurality of buffer circuits to precharge the compensation capacitor coupled to the output of the voltage control circuit.

4. The circuit of claim 2, further comprising a third set of switches configured to selectively couple the voltage control nodes of the plurality of regulator circuits with the buffer input of the at least one buffer circuit, the buffer output of the at least one buffer circuit coupled to the output of the voltage control circuit.

5. The circuit of claim 2, wherein the at least one buffer circuit is coupled with the output of the voltage control circuit during a first time interval, the selected one of the voltage control nodes of the plurality of regulator circuits is coupled with the output of the voltage control circuit through one of the first set of switches during a second time interval following the first time interval, and the selected one of the regulated voltage signals output from the plurality of regulator circuits is coupled with the input of the voltage control circuit through one of the second set of switches during a third time interval overlapping the first time interval and the second time interval.

6. The circuit of claim 1, wherein the at least one buffer circuit is configured to provide routing separation between the voltage control circuit and the regulator circuit.

7. The circuit of claim 6, wherein the at least one buffer circuit comprises a current regulation loop coupled between a second terminal of a transistor and a first terminal of the transistor, the current regulation loop including a plurality of mirror transistors.

8. The circuit of claim 1, wherein each regulator circuit further comprises a buffer circuit having a buffer circuit input coupled to the voltage control node to receive the control voltage and a buffer circuit output configured in a voltage control loop to set the regulated voltage signal at the output of the regulator.

9. The circuit of claim 1, further comprising a plurality of clock intervals, the first set of switches selectively coupling the output of the voltage control circuit with the selected one of the voltage control nodes during a first clock interval, and the second set of switches selectively coupling the selected one of the regulated voltage signals output from the plurality of regulator circuits with the input of the voltage control circuit during at least a second clock interval, the second clock interval overlapping the first clock interval.

10. The circuit of claim 1, wherein the voltage control circuit comprises a resistor divider circuit having an input coupled with the second plurality of switches to receive the selected one of the regulated voltage signals from the plurality of regulator circuits and an output configured to provide a feedback voltage signal.

11. The circuit of claim 10, wherein the resistor divider circuit comprises a variable resistance element to adjust a resistance value based on the selected one of the regulated voltage signals output from the plurality of regulator circuits.

12. The circuit of claim 10, wherein the voltage control circuit further comprises an amplifier including:
    a first input coupled with the resistor divider circuit to receive the feedback voltage signal;
    a second input coupled to receive a reference voltage signal; and
    an output to generate the voltage control signal based on comparing the feedback voltage signal with the reference voltage signal.

13. The circuit of claim 1, wherein a first regulated voltage signal output from a first one of the plurality of regulator circuits is different than a second regulated voltage signal output from a second one of the plurality of regulator circuits.

14. The circuit of claim 1, wherein the voltage control circuit, the first set of switches and the second set of switches form a voltage regulation loop for each of the plurality of regulators, the voltage regulation loop configured to regulate the control voltage of the voltage control nodes of the plurality of regulator circuits.

15. The circuit of claim 14, wherein the voltage regulation loop forms a discrete-time voltage regulation loop for each of the plurality of regulator circuits at different time intervals.

16. The circuit of claim 1, wherein one or more regulator circuits further comprise a current control circuit.

17. The circuit of claim 16, wherein the current control circuit forms continuous-time current regulation loops for each regulator and wherein the current control circuit has a faster response time than a response time of the voltage control circuit.

18. The circuit of claim 16, the current control circuit comprising:
- a pass transistor having a first terminal to receive an input voltage for a selected regulator circuit, a second terminal to provide a regulated output voltage to an output node of the selected regulator circuit, and a control terminal;
- a current sensing transistor having a first terminal coupled with the second terminal of the pass transistor at the output of the regulator circuit, a second terminal to output a loop current complementary to a load current at the output node of the selected regulator circuit, and a control terminal to receive the voltage control signal from the voltage control circuit; and
- a current regulation loop coupled between the second terminal of the current sensing transistor and the control terminal of the pass transistor, the current regulation loop comprising a plurality of current mirrors and one or more current summation circuits.

19. The circuit of claim 1, wherein the plurality of regulator circuits are linear regulator circuits.

20. The circuit of claim 1, wherein the plurality of regulator circuits are switching regulator circuits.

21. The circuit of claim 20, wherein at least one switching regulator circuit comprises:
- a comparator having an input coupled to the voltage control node;
- at least one switching transistor; and
- an inductor coupled to a terminal of the at least one switching transistor.

22. The circuit of claim 21, further comprising a current control circuit having an input configured to sense a current and an output coupled to a second terminal of the comparator.

23. A method comprising:
- generating regulated voltage signals output from each of a plurality of regulator circuits, wherein each regulator circuit comprises a capacitor coupled with a voltage control node to store a control voltage;
- selectively coupling, during a first time interval, a selected one of the regulated voltage signals output from the plurality of regulator circuits with an input of a voltage control circuit;
- outputting a voltage control signal from an output of the voltage control circuit;
- selectively coupling, during a second time interval, the output of the voltage control circuit with a selected one of the voltage control nodes of the plurality of regulator circuits to precharge the output of the voltage control circuit with the stored control voltage of the selected voltage control node via a first signal path having a buffer circuit coupled between the selected one of the voltage control nodes and the output of the voltage control circuit; and
- selectively coupling, during a third time interval following the second time interval, the output of the voltage control circuit with the selected one of the voltage control nodes via a second signal path,
- wherein the first time interval overlaps the second time interval and the third time interval; and
- wherein each regulator circuit is configured to receive the voltage control signal to set the control voltage, and to output a corresponding regulated voltage signal.

24. A circuit comprising:
- a plurality of regulator means for producing regulated voltages, each regulator means configured to receive a voltage control signal, and to output a regulated voltage signal, each regulator means comprising means for storing a control voltage on a voltage control node;
- voltage control means for controlling the plurality of regulator means, the voltage control means having an input configured to sense regulated voltage signals output from the plurality of regulator means and to output the voltage control signal to set the control voltages of the plurality of regulator means;
- means for selectively coupling a selected one of the regulated voltage signals output from the plurality of regulator means with the input of the voltage control means during a first time interval;
- means for selectively coupling the voltage control node of the selected one of the plurality of regulator means with the output of the voltage control means to precharge the output of the voltage control means with the stored control voltage of the selected voltage control node during a second time interval via a first signal path having a buffer circuit coupled between the selected voltage control node and the output of voltage control means; and
- means for selectively coupling the output of the voltage control means with the selected voltage control node during a third time interval following the second time interval via a second signal path,
- wherein the first time interval overlaps the second time interval and the third time interval.

* * * * *